United States Patent
Sellier et al.

(10) Patent No.: US 9,485,286 B1
(45) Date of Patent: *Nov. 1, 2016

(54) SHARING MEDIA ITEMS WITH PASS PHRASES

(71) Applicant: Amazon Technologies, Inc., Reno, NV (US)

(72) Inventors: Laurent E. Sellier, San Francisco, CA (US); Edward James Gayles, Tracy, CA (US); Lawrence Arnold Lynch-Freshner, Boulder Creek, CA (US); Sailesh Rachabathuni, Santa Clara, CA (US); David Berbessou, Sunnyvale, CA (US); Xuejin Zhou, Redwood City, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,924

(22) Filed: Jun. 24, 2014

Related U.S. Application Data

(63) Continuation of application No. 12/715,780, filed on Mar. 2, 2010, now Pat. No. 8,799,658.

(51) Int. Cl.
| | |
|---|---|
| *H04L 29/00* | (2006.01) |
| *H04L 29/06* | (2006.01) |
| *G06F 3/16* | (2006.01) |

(52) U.S. Cl.
CPC ............ *H04L 65/403* (2013.01); *G06F 3/167* (2013.01)

(58) Field of Classification Search
CPC ............... G06F 21/10; G06F 21/62; G06F 2221/2137; G06F 21/60; G06F 3/167; G06F 3/0484; H04W 12/00; H04L 51/04; H04L 51/10; H04L 51/046; H04L 65/403
See application file for complete search history.

(56) References Cited

U.S. PATENT DOCUMENTS

| | | | |
|---|---|---|---|
| 4,674,065 A | 6/1987 | Lange et al. | |
| 4,773,039 A | 9/1988 | Zamora | |
| 5,255,386 A | 10/1993 | Prager | |
| 5,696,962 A | 12/1997 | Kupiec | |
| 5,710,887 A | 1/1998 | Chelliah et al. | |
| 5,721,902 A | 2/1998 | Schultz | |
| 5,771,378 A | 6/1998 | Holt et al. | |
| 5,828,991 A * | 10/1998 | Skiena et al. | 704/9 |

(Continued)

FOREIGN PATENT DOCUMENTS

| | | |
|---|---|---|
| EP | 1077436 | 2/2001 |
| JP | H11265413 A | 9/1999 |

(Continued)

OTHER PUBLICATIONS

Utility U.S. Appl. No. 11/548,111, filed Oct. 10, 2006, entitled "Utilizing Phrase Tokens in Transaction" Agarwal, et al.

(Continued)

*Primary Examiner* — Don Zhao
(74) *Attorney, Agent, or Firm* — Lee & Hayes, PLLC

(57) ABSTRACT

A sharing service receives a request to store a media item stored on an electronic book reader device for sharing with one or more other content rendering devices. In response, the sharing service associates a pass phrase with the request. The sharing service then provides the media item to those devices (e.g., eBook reader devices) that provide the pass phrase to the sharing service within a predetermined amount of time.

20 Claims, 16 Drawing Sheets

(56) References Cited

U.S. PATENT DOCUMENTS

| | | | |
|---|---|---|---|
| 5,862,321 A | 1/1999 | Lamming et al. |
| 5,870,473 A | 2/1999 | Boesch et al. |
| 5,898,825 A | 4/1999 | Eberhard |
| 5,907,824 A | 5/1999 | Tzirkel-Hancock |
| 5,953,710 A | 9/1999 | Fleming |
| 5,963,965 A | 10/1999 | Vogel |
| 6,047,268 A | 4/2000 | Bartoli et al. |
| 6,141,760 A | 10/2000 | Abadi et al. |
| 6,178,396 B1 | 1/2001 | Ushioda |
| 6,202,064 B1 | 3/2001 | Julliard |
| 6,314,419 B1 | 11/2001 | Faisal |
| 6,332,131 B1 | 12/2001 | Grandcolas et al. |
| 6,343,279 B1 | 1/2002 | Bissonette et al. |
| 6,377,965 B1 | 4/2002 | Hachamovitch et al. |
| 6,411,950 B1 | 6/2002 | Moricz et al. |
| 6,496,931 B1 | 12/2002 | Rajchel et al. |
| 6,539,481 B1 | 3/2003 | Takahashi et al. |
| 6,564,213 B1 | 5/2003 | Ortega et al. |
| 6,640,304 B2 | 10/2003 | Ginter et al. |
| 6,658,568 B1 | 12/2003 | Ginter et al. |
| 6,665,659 B1 | 12/2003 | Logan |
| 6,697,793 B2 | 2/2004 | McGreevy |
| 6,853,987 B1 | 2/2005 | Cook |
| 6,856,963 B1 | 2/2005 | Hurwitz |
| 6,892,198 B2 | 5/2005 | Perisic et al. |
| 6,988,657 B1 | 1/2006 | Singer et al. |
| 7,035,789 B2 | 4/2006 | Abrego et al. |
| 7,076,652 B2 | 7/2006 | Ginter et al. |
| 7,136,841 B2 | 11/2006 | Cook |
| 7,184,950 B2 | 2/2007 | Weise |
| 7,191,115 B2 | 3/2007 | Moore |
| 7,197,455 B1 * | 3/2007 | Sudo et al. ............... 704/231 |
| 7,213,748 B2 | 5/2007 | Tsuei et al. |
| 7,264,152 B2 | 9/2007 | Tsuei et al. |
| 7,383,224 B2 | 6/2008 | Huennekens et al. |
| 7,395,241 B1 | 7/2008 | Cook et al. |
| 7,418,444 B2 | 8/2008 | Flank et al. |
| 7,426,507 B1 | 9/2008 | Patterson |
| 7,519,590 B2 | 4/2009 | Chandrasekar et al. |
| 7,548,899 B1 | 6/2009 | Del Favero, Jr. et al. |
| 7,565,345 B2 | 7/2009 | Bailey et al. |
| 7,587,197 B2 | 9/2009 | Kimbrell |
| 7,664,831 B2 | 2/2010 | Cartmell et al. |
| 7,676,507 B2 | 3/2010 | Maim |
| 7,865,567 B1 | 1/2011 | Hendricks et al. |
| 7,912,702 B2 | 3/2011 | Bennett |
| 7,925,498 B1 | 4/2011 | Baker et al. |
| 7,991,608 B2 | 8/2011 | Johnson et al. |
| 8,037,086 B1 | 10/2011 | Upstill et al. |
| 8,065,328 B2 * | 11/2011 | Strandel et al. ............ 707/781 |
| 8,131,540 B2 | 3/2012 | Marchisio et al. |
| 8,136,034 B2 | 3/2012 | Stanton et al. |
| 8,150,769 B2 | 4/2012 | Gupta et al. |
| 8,161,534 B2 | 4/2012 | Golle et al. |
| 8,166,045 B1 | 4/2012 | Mazumdar et al. |
| 8,170,954 B2 | 5/2012 | Keresman, III et al. |
| 8,190,628 B1 | 5/2012 | Yang et al. |
| 8,266,169 B2 | 9/2012 | Bobrow et al. |
| 8,316,041 B1 | 11/2012 | Chang et al. |
| 8,316,296 B2 | 11/2012 | Paek et al. |
| 8,346,792 B1 | 1/2013 | Baker et al. |
| 8,359,190 B2 | 1/2013 | Kirshenbaum |
| 8,359,191 B2 | 1/2013 | Chen et al. |
| 8,374,871 B2 | 2/2013 | Ehsani et al. |
| 8,380,491 B2 | 2/2013 | Leacock et al. |
| 8,423,349 B1 | 4/2013 | Huynh et al. |
| 8,484,016 B2 | 7/2013 | Brockett et al. |
| 8,484,089 B1 * | 7/2013 | Lin et al. ............... 705/26.1 |
| 8,516,013 B2 | 8/2013 | Geller |
| 8,661,012 B1 | 2/2014 | Baker et al. |
| 2001/0032192 A1 | 10/2001 | Putta et al. |
| 2001/0041977 A1 | 11/2001 | Aoyagi et al. |
| 2002/0032564 A1 | 3/2002 | Ehsani et al. |
| 2002/0046169 A1 | 4/2002 | Keresman, III et al. |
| 2002/0112171 A1 | 8/2002 | Ginter et al. |
| 2002/0123973 A1 | 9/2002 | Eccles et al. |
| 2002/0188587 A1 | 12/2002 | McGreevy |
| 2002/0188621 A1 | 12/2002 | Flank et al. |
| 2003/0004716 A1 | 1/2003 | Haigh et al. |
| 2003/0061170 A1 | 3/2003 | Uzo |
| 2003/0065919 A1 | 4/2003 | Albert et al. |
| 2003/0088784 A1 | 5/2003 | Ginter et al. |
| 2003/0120846 A1 | 6/2003 | Clapper |
| 2003/0187789 A1 | 10/2003 | Karas et al. |
| 2003/0208439 A1 | 11/2003 | Rast |
| 2003/0233318 A1 | 12/2003 | King et al. |
| 2004/0030551 A1 | 2/2004 | Marcu et al. |
| 2004/0064447 A1 | 4/2004 | Simske et al. |
| 2004/0078273 A1 | 4/2004 | Loeb et al. |
| 2004/0083184 A1 | 4/2004 | Tsuei et al. |
| 2004/0098375 A1 | 5/2004 | DeCarlo, III |
| 2004/0153451 A1 | 8/2004 | Phillips et al. |
| 2004/0177120 A1 | 9/2004 | Kirsch |
| 2004/0199375 A1 | 10/2004 | Ehsani et al. |
| 2004/0254893 A1 | 12/2004 | Tsuei et al. |
| 2004/0254894 A1 | 12/2004 | Tsuei et al. |
| 2004/0260653 A1 | 12/2004 | Tsuei et al. |
| 2005/0027691 A1 | 2/2005 | Brin et al. |
| 2005/0044160 A1 | 2/2005 | McElligott |
| 2005/0050469 A1 | 3/2005 | Uchimoto et al. |
| 2005/0120108 A1 | 6/2005 | Wisniewski et al. |
| 2005/0131826 A1 | 6/2005 | Cook |
| 2005/0171851 A1 | 8/2005 | Applebaum et al. |
| 2005/0240536 A1 | 10/2005 | Davis et al. |
| 2005/0261988 A1 | 11/2005 | Horel et al. |
| 2006/0015484 A1 | 1/2006 | Weng et al. |
| 2006/0087941 A1 * | 4/2006 | Obradovich ............... 369/47.12 |
| 2006/0173772 A1 | 8/2006 | Hayes et al. |
| 2006/0230022 A1 | 10/2006 | Bailey et al. |
| 2006/0253399 A1 | 11/2006 | Chatani |
| 2007/0011154 A1 | 1/2007 | Musgrove et al. |
| 2007/0022058 A1 | 1/2007 | Labrou et al. |
| 2007/0088952 A1 | 4/2007 | Hewitt et al. |
| 2007/0168469 A1 | 7/2007 | Church et al. |
| 2007/0226169 A1 | 9/2007 | Solyanik et al. |
| 2008/0019530 A1 | 1/2008 | Eldridge et al. |
| 2008/0040233 A1 | 2/2008 | Wildman et al. |
| 2008/0040274 A1 | 2/2008 | Uzo |
| 2008/0046366 A1 | 2/2008 | Bemmel et al. |
| 2008/0046980 A1 | 2/2008 | Peng |
| 2008/0052226 A1 | 2/2008 | Agarwal et al. |
| 2008/0082903 A1 | 4/2008 | McCurdy et al. |
| 2008/0114721 A1 | 5/2008 | Jones et al. |
| 2008/0154772 A1 | 6/2008 | Carlson |
| 2008/0162455 A1 | 7/2008 | Daga et al. |
| 2008/0168073 A1 * | 7/2008 | Siegel et al. ............... 707/100 |
| 2008/0189188 A1 | 8/2008 | Morgenstern |
| 2008/0189293 A1 | 8/2008 | Strandel et al. |
| 2008/0209534 A1 | 8/2008 | Keronen et al. |
| 2008/0222711 A1 * | 9/2008 | Michaelis ............... 726/7 |
| 2009/0030989 A1 | 1/2009 | Maresh et al. |
| 2009/0064294 A1 | 3/2009 | Cook et al. |
| 2009/0070103 A1 | 3/2009 | Beggelman et al. |
| 2009/0113543 A1 * | 4/2009 | Adams et al. ............... 726/18 |
| 2009/0192928 A1 | 7/2009 | Abifaker |
| 2009/0234876 A1 * | 9/2009 | Schigel et al. ............... 707/102 |
| 2009/0271283 A1 * | 10/2009 | Fosnacht et al. ............... 705/26 |
| 2009/0282035 A1 | 11/2009 | Ferreira et al. |
| 2009/0293110 A1 | 11/2009 | Koga |
| 2009/0326953 A1 | 12/2009 | Peralta Gimenez et al. |
| 2009/0327244 A1 | 12/2009 | Rizal |
| 2010/0031043 A1 | 2/2010 | Burger et al. |
| 2010/0032192 A1 | 2/2010 | Kishi |
| 2010/0042628 A1 * | 2/2010 | Crowley et al. ............... 707/9 |
| 2010/0042717 A1 * | 2/2010 | Strandell et al. ............ 709/224 |
| 2010/0083103 A1 | 4/2010 | Paek et al. |
| 2010/0138397 A1 | 6/2010 | Li et al. |
| 2010/0146115 A1 | 6/2010 | Bezos |
| 2010/0146283 A1 * | 6/2010 | Poitier et al. ............... 713/176 |
| 2010/0161314 A1 | 6/2010 | Karttunen et al. |
| 2010/0179801 A1 | 7/2010 | Huynh et al. |
| 2010/0250130 A1 | 9/2010 | Wiegand et al. |
| 2010/0312778 A1 | 12/2010 | Lu et al. |
| 2010/0333131 A1 * | 12/2010 | Parker et al. ............... 725/31 |

(56) References Cited

U.S. PATENT DOCUMENTS

| | | | |
|---|---|---|---|
| 2011/0131157 | A1 | 6/2011 | Iyer et al. |
| 2011/0153854 | A1* | 6/2011 | Chickering ............... 709/229 |
| 2011/0154456 | A1* | 6/2011 | Machani ..................... 726/6 |
| 2011/0225417 | A1 | 9/2011 | Maharajh et al. |
| 2012/0072404 | A1 | 3/2012 | Murphy et al. |
| 2013/0198084 | A1 | 8/2013 | Agarwal et al. |
| 2013/0204789 | A1 | 8/2013 | Agarwal et al. |
| 2013/0204790 | A1 | 8/2013 | Agarwal et al. |

FOREIGN PATENT DOCUMENTS

| | | | |
|---|---|---|---|
| JP | 2001357202 | A | 12/2001 |
| JP | 2002163579 | A | 6/2002 |
| JP | 2002197024 | A | 7/2002 |
| JP | 2003308437 | A | 10/2003 |
| JP | 2004005515 | A | 1/2004 |
| JP | 2004240764 | A | 8/2004 |
| JP | 2005018265 | A | 1/2005 |
| JP | 2006040235 | A | 2/2006 |
| WO | WO2004006194 | A1 | 1/2004 |
| WO | WO2005109268 | A1 | 11/2005 |
| WO | WO2008025037 | A2 | 2/2008 |

OTHER PUBLICATIONS

Utility U.S. Appl. No. 12/331,894, filed Dec. 10, 2008, entitled "Content Sharing" Jeffrey P. Bezos.
Utility U.S. Appl. No. 12/352,970, filed Jan. 13, 2009, entitled "Generating and Suggesting Phrases" Jesensky, et al.
U.S. Appl. No. 12/353,025, filed Jan. 13, 2009, Jesensky, et al., "Generating Personalized Phrases".
U.S. Appl. No. 12/353,059, filed Jan. 13, 2009, Jesensky, et al., "Generating Mined Phrases".
U.S. Appl. No. 12/353,091, filed Jan. 13, 2009, Jesensky, et al., "Generating Constructed Phrases".
U.S. Appl. No. 12/353,120, filed Jan. 13, 2009, Huynh, et al., "Filtering Phrases".
U.S. Appl. No. 12/353,155, filed Jan. 13, 2009, Huynh, et al., "Filtering Phrases".
U.S. Appl. No. 12/353,170, filed Jan. 13, 2009, Huynh, et al., "Phrase Feedback Loop".
U.S. Appl. No. 12/353,184, filed Jan. 13, 2009, Gefen, et al., "Using Phrase Tokens for Performing Transactions".
U.S. Appl. No. 12/510,761, filed Jul. 28, 2009, Jesensky, et al., "Determining Similar Phrases".
Utility U.S. Appl. No. 12/544,891, filed Aug. 20, 2009, entitled "Enforcing User-Specified Rules" Williams, et al.
U.S. Appl. No. 12/715,780, filed Mar. 2, 2010, Sellier, et al, "Sharing Media Items with Pass Phrases".
U.S. Appl. No. 61/021,275, filed Jan. 15, 2008, Rode, et al., "Systems and Methods of Retrieving Informaton".
Allan, et al., "Using Part-of-speech Patterns to Reduce Query Ambiguity", Proceedings of the 25th annual international ACM SIGIR conference on Research and development in information retrieval (SIGIR'02), ACM, New York, NY, pp. 307-314.
"Amazon.com: What are Statistically Improbable Phrases?", retrieved on Dec. 15, 2008 at <<http://www.amazon.com/gp/search-inside/sipshelp.html>>, Amazon.com, 1 page.
Brown, et al., "Class-Based n-gram Models of Natural Language", MIT Press, Computational Linguistics, vol. 18, Issue 4, Dec. 1992, pp. 467-479.
Evernote.com, retrieved on Jul. 21, 2009 at <<http://evernote.com/>>, 5 pgs.
"Google Sets", retrieved on Dec. 15, 2008 at <<http://labs.google.com/sets>>, Google, 1 page.
Jones, et al., "Generating Query Substitutions", WWW 2006, Edinburgh, Scotland, ACM, 2006, pp. 387-396.
Office action for U.S. Appl. No. 12/353,184, mailed on Jul. 6, 2012, Gefen et al., "Using Phrase Tokens for Performing Transactions", 20 pages.
Office action for U.S. Appl. No. 12/715,780, mailed on Jan. 11, 2013, Sellier et al., "Sharing Media Items with Pass Phrases", 45 pages.
Office action for U.S. Appl. No. 12/352,970, mailed on Jan. 16, 2013, Jesensky et al., "Generating and Suggesting Phrases for a User", 26 pages.
Office action for U.S. Appl. No. 12/353,059, mailed on Jan. 24, 2013, Jesensky et al., "Mining Phrases for Association With a User", 40 pages.
Office action for U.S. Appl. No. 12/353,155, mailed on Jan. 29, 2013, Huynh et al., "Determining Phrases Related to Other Phrases", 36 pages.
Office action for U.S. Appl. No. 12/353,025, mailed on Oct. 24, 2011, Jesenky et al., "Generating Personalized Phrases", 25 pages.
Office Action for U.S. Appl. No. 12/510,761, mailed on Nov. 19, 2013, James Jesensky, "Determining Similar Phrases", 19 pages.
Office action for U.S. Appl. No. 12/353,184, mailed on Nov. 28, 2011, Gefen et al., "Using Phrase Tokens for Performing Transactions", 19 pages.
Office action for U.S. Appl. No. 12/544,891, mailed on Nov. 5, 2012, Williams et al, "Enforcing User-Specified Rules", 21 pages.
Office action for U.S. Appl. No. 12/715,780, mailed on Dec. 2, 2013, Sellier, et al., "Sharing Media Items with Pass Phrases", 49 pages.
Non-Final Office Action for U.S. Appl. No. 12/353,091, mailed on Dec. 8, 2011, James Jesensky et al., "Generating Constructed Phrases", 18 pages.
Office Action for U.S. Appl. No. 12/353,091, mailed on Apr. 9, 2014, James Jesensky, "Generating Constructed Phrases", 21 pages.
Non-Final Office Action for U.S. Appl. No. 12/544,891, mailed on May 24, 2012, Matthew T. Williams et al., "Enforcing User-Specified Rules", 17 pages.
Non-Final Office Action for U.S. Appl. No. 12/353,170, mailed on May 25, 2012, Steve Huynh et al., "Phrase Feedback Loop", 40 pages.
Non-Final Office Action for U.S. Appl. No. 12/715,780, mailed on Jun. 19, 2012, Laurent E. Sellier et al., "Sharing Media Items with Pass Phrases", 46 pages.
Office action for U.S. Appl. No. 12/352,970, mailed on Jun. 27, 2012, Jesensky et al., "Generating and Suggesting Phrases", 34 pages.
Final Office Action for U.S. Appl. No. 12/510,761, mailed on Jun. 4, 2014, James Jesensky, "Determining Similar Phrases", 25 pages.
Final Office Action for U.S. Appl. No. 12/353,091, mailed on Jun. 7, 2012, James Jesensky et al., "Generating Constructed Phrases", 18 pages.
Office action for U.S. Appl. No. 12/715,780, mailed on Jul. 10, 2013, Sellier et al., "Sharing Media Items with Pass Phrases", 46 pages.
Non-Final Office Action for U.S. Appl. No. 12/353,059, mailed on Jul. 13, 2012, James Jesensky et al, "Generating Mined Phrases", 37 pages.
Non-Final Office Action for U.S. Appl. No. 12/353,120, mailed on Jul. 19, 2012, Steve Huynh et al., "Filtering Phrases", 63 pages.
Non-Final Office Action for U.S. Appl. No. 12/353,155, mailed on Aug. 1, 2012, Steve Huynh et al., "Determining Phrases Related to Other Phrases", 29 pages.
Office action for U.S. Appl. No. 12/353,170, mailed on Sep. 14, 2012, Huynh et al., "Phrase Feedback Loop", 48 pages.
"Statistically Improbable Phrases" retrieved on Dec. 15, 2008 at <<http://en.wikipedia.org/wiki/Statistically_Improbable_Phrases>>, Wikipedia, the free encyclopedia, 2 pages.
Wang, et al., "Mining Term Association Patterns from Search Logs for Effective Query Reformulation", CIKM'08, Napa Valley, CA, USA, ACM, 2008, pp. 479-488.
"What are Amazon.com Statistically Improbable Phrases?", retrieved on Dec. 15, 2008 at <<http://www.amazon.com/gp/search-inside/sipshelp-dp.html>>, Amazon.com, 1 page.
Office action for U.S. Appl. No. 12/353,184, mailed on Oct. 3, 2014, Gefen et al., "Using Phrase Tokens for Performing Transactions", 28 pages.
Office action for U.S. Appl. No. 12/353,025, mailed on Sep. 10, 2014, Jesensky et al., "Generating Personalized Phrases", 22 pages.

(56) References Cited

OTHER PUBLICATIONS

Final Office Action for U.S. Appl. No. 11/548,111, mailed on Jun. 17, 2015, Amit D. Agarwal, "Utilizing Phrase Tokens in Transactions", 20 pages.
Office action for U.S. Appl. No. 12/544,891 mailed on Aug. 25, 2015, Williams et al., "Enforcing User-Specified Rules", 18 pages.
Office Action for U.S. Appl. No. 12/353,170, mailed on Mar. 2, 2015, Steven Huynh, "Phrase Feedback Loop", 12 pages.
Final Office Action for U.S. Appl. No. 12/353,025, mailed on Apr. 28, 2015, James Jesnsky, "Generating Personalized Phrases", 12 pages.
Final Office Action for U.S. Appl. No. 12/414,236, mailed on Jan. 30, 2015, Rajendra Kumar Vippagunta, "Querying for User Account Information", 18 pages.
Office action for U.S. Appl. No. 12/414,236, mailed on Oct. 12, 2012, Vippagunta et al., "Querying for User Account Information", 15 pages.
Non-Final Office Action for U.S. Appl. No. 11/548,111, mailed on Oct. 20, 2014, Amit D. Agarwal, "Utilizing Phrase Tokens in Transactions", 24 pages.
Final Office Action for U.S. Appl. No. 11/548,111, mailed on Nov. 13, 2009, Amit D. Agarwal, "Utilizing Phrase Tokens in Transactions", 26 pages.
Non-Final Office Action for U.S. Appl. No. 12/414,236, mailed on Dec. 8, 2011, Rajendra Kumar Vippagunta et al., "Querying for User Account Information", 12 pages.
Non-Final Office Action for U.S. Appl. No. 11/548,111, mailed on Apr. 2, 2009, Amit D. Agarwal, "Utilizing Phrase Tokens in Transactions", 21 pages.
Office action for U.S. Appl. No. 12/510,761, mailed on May 8, 2015, Jesensky et al., "Determining Similar Phrases", 24 pages.
Final Office Action for U.S. Appl. No. 12/353,184, mailed on Jun. 16, 2015, Howard B. Gefen, "Using Phrase Tokens for Performing Transactions", 29 pages.
Office action for U.S. Appl. No. 12/414,236, mailed on Jul. 8, 2014, Vippagunta et al., "Querying for User Account Information", 14 pages.
PCT International Search Report and Written Opinion for PCT Application No. PCT/US07/76920 mailed on May 2, 2008, 13 pages.
Riloff et al., "Learning Extraction Pattern for Subjective Expressions", Proceedings of the 2003 Conference on Empirical Methods in Natural Language Processing, 2003, 8 pages.
Offce Action for U.S. Appl. No. 13/829,435, mailed on Oct. 7, 2015, Agarwal et al., "Utilizing Phrase Tokens in Transactions", 21 pages.
Offce Action for U.S. Appl. No. 13/828,841, mailed on Oct. 8, 2015, Agarwal et al., "Utilizing Phrase Tokens in Transactions", 19 pages.
Office action for U.S. Appl. No. 12/414,236, mailed on Sep. 21, 2015, Vippagunta et al., "Querying for User Account Information", 23 pages.
Office action for U.S. Appl. No. 12/353,170, mailed on Sep. 24, 2015, Huynh et al., "Phrase Feedback Loop", 10 pages.
Office action for U.S. Appl. No. 12/544,891, mailed on Mar. 10, 2016, Williams et al., "Enforcing User-Specified Rules", 22 pages.
Office action for U.S. Appl. No. 12/353,025, mailed on Mar. 18, 2016, Jessensky et al., "Generating Personalized Phrases", 29 pages.
Office action for U.S. Appl. No. 12/414,236, mailed on Jun. 2, 2016, Vippagunta et al., "Querying for User Account Information", 17 pages.

* cited by examiner ic book reader devices that provide the pass phrase associated with the shared media item.

FIG. 10 illustrates an interface of an electronic book reader device that facilitates entry of a pass phrase for submitting the phrase to the sharing service of FIG. 1 to receive a shared media item.

FIG. 11 illustrates a display screen of the electronic book reader device of FIG. 10 after the device has received the shared media item. This display screen indicates which of the media items stored on the electronic book reader device are "shared" items, including the item just received from the sharing service.

FIG. 12 illustrates a configuration in which an electronic book reader device shares a document with multiple other electronic book reader devices via the sharing service of FIG. 1.

FIG. 13 illustrates a configuration in which an electronic book reader device shares a portion of an electronic book with multiple other electronic book reader devices via the sharing service of FIG. 1.

FIG. 14 illustrates a configuration in which an electronic book reader device shares an article in a periodical with multiple other electronic book reader devices via the sharing service of FIG. 1. In addition to sharing the article, the sharing service offers each electronic book reader device the opportunity to subscribe to the periodical.

FIG. 15 is a flow diagram showing a process of storing a media item for later access by electronic book reader devices that provide the pass phrase associated with the stored media item.

FIG. 16 is a flow diagram showing a process of sending a request to store a media item at a sharing service for sharing the item with an electronic book reader device that provides a pass phrase associated with the item.

SHARING MEDIA ITEMS WITH PASS PHRASES

RELATED APPLICATIONS

This application claims priority to and is a continuation of U.S. patent application Ser. No. 12/715,780, filed on Mar. 2, 2010, the entire contents of which are incorporated herein by reference.

This application is related to U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference in their entirety.

This application is also related to U.S. patent application Ser. No. 12/352,970, filed on Jan. 13, 2009, entitled GENERATING AND SUGGESTING PHRASES and incorporated herein by reference in its entirety.

BACKGROUND

A large and growing population of users is enjoying entertainment through the consumption of digital media items (or simply "media items"), such as music, movies, images, electronic books, and so on. The users employ various electronic devices to consume such media items. Among these electronic devices are electronic book reader devices, cellular telephones, personal digital assistant (PDA), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
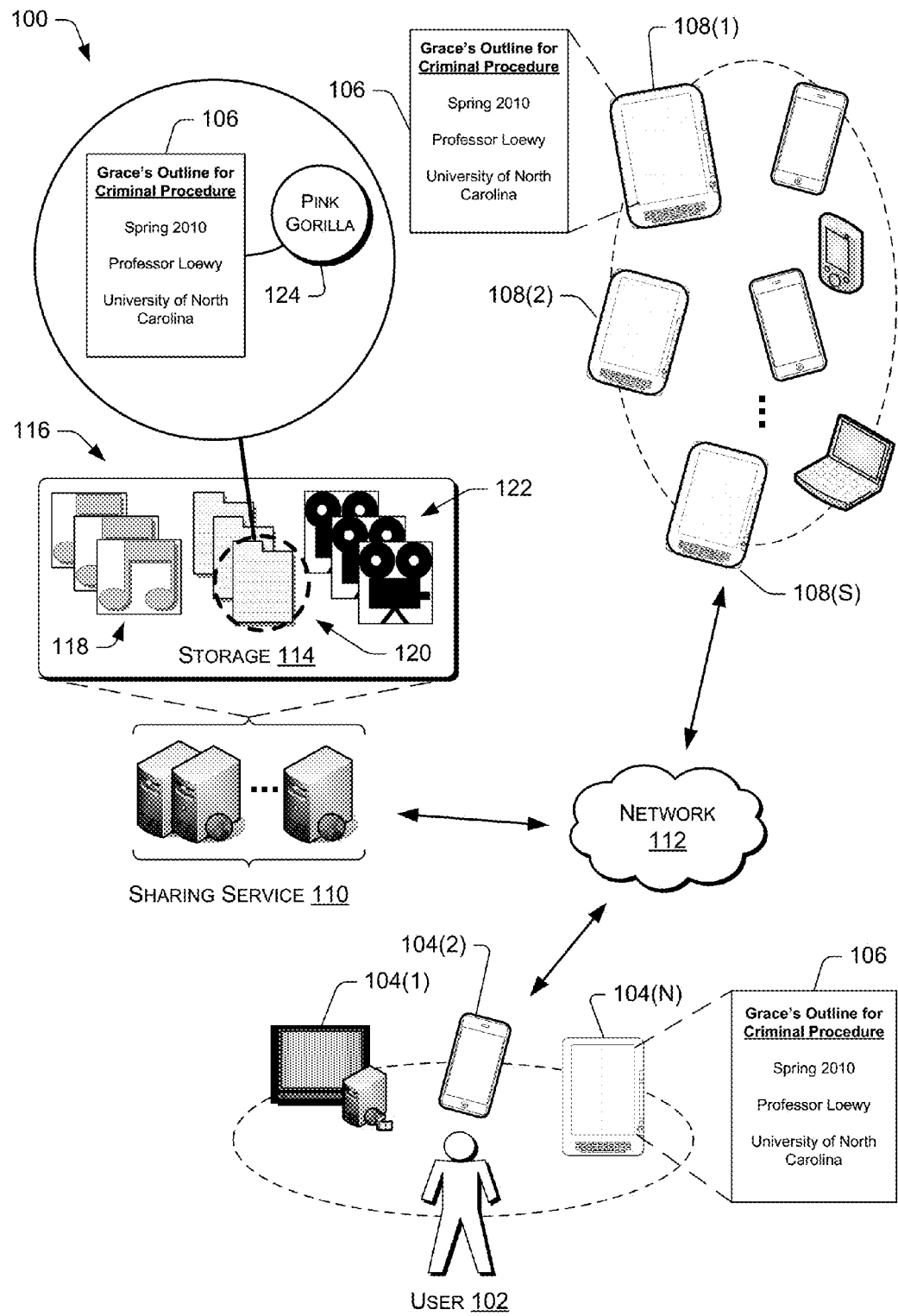
FIG. 1 illustrates an architecture in which a user opts to share a media item stored on a device of the user with a group of other client devices, including multiple electronic book reader devices. Each of these client devices receives the media item from a sharing service after sending a pass phrase associated with the shared media item to the sharing service.

This disclosure describes an architecture and techniques in which a user leverages a sharing service to share a media item stored on a device of the user with one or more other content rendering devices. These content rendering devices receive the shared media item in response to providing a pass phrase associated with the media item to the sharing service.

The media item may be of various types of digital content, such as a document, an audio file, a video file, an image, an electronic book, and so on. Both the device on which the media item is originally stored and the receiving content rendering devices may be embodied in many ways, such as electronic book reader devices, cellular telephones, personal digital assistant (PDA), portable media players, tablet computers, netbooks, and the like. However, in specific implementations described below, the shared media item is originally stored on an electronic book (eBook) reading device ("eBook reader device"), while the devices that receive the shared media item from the sharing service also comprises eBook reader devices.

In these implementations, the user initially sends a request to the sharing service (from the eBook reader device or otherwise) to share the media item stored on the eBook reader device for a predetermined amount of time (e.g., 2 hours, 2 weeks, etc.). The sharing service then associates a pass phrase (e.g., "Pink Gorilla") with the request and communicates this pass phrase to the user. The eBook reader device (or another device of the user) then uploads the media item to the sharing service, which stores the item in association with the pass phrase for the predetermined amount of time.

In the interim, the user who wishes to share the document communicates the pass phrase to those users with whom the sharing user desires to share the item. For instance, the sharing user may send the pass phrase to these users via an email, a text message, or the like. Conversely, in instances where these users are physically proximate to the sharing user, the sharing user may simply audibly recite the pass phrase to these users. Each of these users then sends the pass phrase to the sharing service via their respective eBook reader devices or otherwise. In response, the sharing service downloads some or the entire shared media item to each of the eBook reader devices. In addition, these users may alternatively or additionally request that the sharing service send the media item to a different type of user device, such as a laptop, a cellular phone, or the like.

After the predetermined amount of time elapses, the sharing service removes the media item from storage. Should the sharing user desire to share another media item with a group of users, this user may again send a request to the sharing service, which will again associate a pass phrase with this new request. As such, the described architecture and techniques facilitate convenient sharing of media items amongst devices, such as eBook reader devices and the like.

Architectural Environment

FIG. 1 illustrates an example architecture 100 in which a user 102 operates a device 104(1), 104(2), . . . , 104(N) to share a media item 106 stored on the same or a different device 104(1)-(N). As illustrated, the user 102 shares the media item 106 with a group of content rendering devices 108(1), 108(2), . . . , 108(S). Both the devices 104(1)-(N) and the devices 108(1)-(S) are variously configured with different functionality to enable consumption of one or more types of media items. The media items may be any type or format of digital content, including, for example, electronic texts (e.g., documents of any format, eBooks, electronic periodicals, such as digital magazines and newspapers, etc.), digital audio (e.g., music, audible books, etc.), digital video (e.g., movies, television, short clips, etc.), images (e.g., art, photographs, etc.), and multi-media content.

As discussed further herein, a media item stored on one device may be transmitted to a sharing service 110, which stores the document in association with a pass phrase. The sharing service 110 then passes the media item to those devices that send the appropriate pass phrase to the sharing service 110.

In the illustrated architecture 100, essentially any type of content rendering device may be used to share and consume media items. In this example, the user 102 operates a desktop computer 104(1) to share the media item 106 stored on the eBook reader device 104(N). Of course, the user 102 could instead use any other device (e.g., the cellular phone 104(2)) to share the media item 106 stored on the eBook reader device 104(N), or the user 102 could simply share the media item 106 directly from the eBook reader device 104(N). In addition, while FIG. 1 illustrates the user 102 sharing a media item stored on the eBook reader device 104(N), the techniques apply equally to instances where the user 102 desires to share a media item stored on a desktop computer, a laptop, a cellular phone or any other device.

FIG. 1 further illustrates that the user 102 may share the media item 106 with a multitude of device types, including eBook reader devices 108(1), 108(2) and 108(S), as well as any other type of device, such as a multifunction communication device (e.g., the iPhone® device from Apple, Inc.), a portable digital assistant (PDA), a laptop computer, a wireless headset, an entertainment system, a portable media player, a tablet computer, a camera, a video camera, a netbook, a notebook, a desktop computer, a gaming console, a DVD player, an media center or any other type of device.

In the illustrated example, the user 102 desires to share the media item 106, which comprises a personal document stored on the eBook reader device 104(N) and entitled "Grace's Outline for Criminal Procedure." This document may be in a Portable Document Format (PDF), a Microsoft Word® format from Microsoft, Inc. or any other document format. In addition, this document may also be stored on one or more other devices associated with the user 102. For instance, the user may connect the eBook reader device 104(N) (in a wired or wireless manner) to the desktop computer 104(1) in order to allow the user 102 to manage the media items and other files stored on the eBook reader device 104(N). As such, the media item 106 may also be stored on or accessible by the desktop computer 104(1).

The user 102 then utilizes the desktop computer (or the eBook reader device 104(N) in some instances) to send a request, to the sharing service 110 and over a network 112, to share the media item 106. That is, the user 102 requests that the sharing service 110 make some or all of the media item 106 available to one or more other devices, such as the devices 108(1)-(S). The network 112 is representative of any one or combination of multiple different types of networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

As illustrated, the sharing service 110 is embodied as one or more servers that collectively have processing and storage capabilities to receive the request from the device 104(1) of the user 102. In response to receiving such a request, the sharing service 110 communicates with the device 104(1) and/or the eBook reader device 104(N) for the purpose of making the media item 106 available to the devices 108(1)-(S). In some implementations, the sharing service 110 makes media items available to these devices by storing the media items, although in other implementations the servers merely facilitate communications between devices or may provide pointers to the media items.

The servers of the sharing service 110 may be embodied in any number of ways, including as a single server, a cluster of servers, a server farm or data center, and so forth, although other server architectures (e.g., mainframe) may also be used. Alternatively, the sharing service 110 may be embodied as a client device, such as desktop computer, a laptop computer, an eBook reader device and so forth.

In the illustrated example, the sharing service 110 includes storage 114 for storing media items 116. These items may include audio files 118, documents 120, video files 122 or any other form of media item, as described above. After receiving a request to make a media item available to multiple devices, such as the request sent by the user 102 from the desktop computer 104(1), the sharing service associates a pass phrase with the request.

The pass phrase comprises a string of alphanumeric characters that, when supplied by another device, grants the device access to the media item associated with the phrase. For instance, the pass phrase may comprise or consist of two or more grammatically correct words, such as "Pink Gorilla," "Good to Go," "Feisty Mango," "Walking in the Rain," or any other group of multiple words. In instances where the pass phrase comprises multiple grammatically correct words, these words may be separated by a space ("Pink Gorilla") or they may not ("PinkGorilla"). In addition, these phrases may be free from numerals, punctuation and/or any other symbol other than letters.

In some instances, the sharing service 110 generates and/or selects the pass phrase and provides the pass phrase to the requesting device (e.g., the desktop computer 104(1)) via the network 112. In other instances, however, the user 102 may select the pass phrase and provide this phrase to the sharing service 110. The sharing service 110 may then associate this received pass phrase with the request.

A different pass phrase may be associated with each request from a particular user, such as the user 102. For instance, if the user 102 desires to share a first media item, the sharing service 110 may provide a first pass phrase (e.g., "Pink Gorilla") to the user 102. If, at a later time, the user 102 desires to share a different media item, the sharing service 110 may provide a different pass phrase (e.g., "Feisty Mango"). In other instances, however, the pass phrase is a phrase that is uniquely and persistently associated with a user and/or a user account of the user. That is, the pass phrase may be a phrase that the user 102 uses repeatedly to share documents with devices. For instance, the user 102 may consistently share media items with use of the pass phrase "Pink Gorilla" that is unique to the user 102.

One type of phrase that is persistently and uniquely associated with a user account is a transaction phrase token, described in U.S. patent application Ser. No. 11/548,111, incorporated by reference above. As this application describes, a transaction phrase token may bind to one or more aspects of a user account, such as a payment instrument and shipping address of the user 102. As such, the user may conduct transactions with retailers (e.g., e-commerce retailers) with use of the transaction phrase token. Furthermore, the user 102 may share documents via the sharing service 110 with use of the transaction phrase token.

In one example described above, the sharing service 110 selects a pass phrase (e.g., "Pink Gorilla") and sends this pass phrase to the device 104(1) of the user 102 that sent the request. Before or after receiving the identification of the pass phrase, the device 104(1) sends the media item 106 to the sharing service 110 for storing. In instances where the eBook reader device 104(N) stores the media item, however, the eBook reader device 104(N) may send this item 106 wirelessly to the sharing service 110 in lieu of the desktop computer 104(1) sending the item 106.

In either instance, after receiving the item the sharing service 110 stores the media item 106 in association with the corresponding pass phrase. FIG. 1 illustrates that the sharing service 110 has stored the media item 106 in association with a pass phrase 124, "Pink Gorilla." Additionally, in instances where the sharing service 110 receives a media item in a format this is not compatible with software running on an eBook reader device, the sharing service 110 converts this item to a format that is compatible with this software. The sharing service 110 then stores the media item in the original format and/or in the converted format.

At this point, the user 102 provides the pass phrase to those users or devices with whom the user 102 desires to share the media item 106. The user 102 may provide this pass phrase audibly (e.g., in-person, over the phone, etc.) or electronically (e.g., by sending an email, a text message, etc.). After receiving the pass phrase, each of these users then sends a request for the media item 106 to the sharing service 110 accompanied by the phrase. In response to receiving these requests accompanied by the phrase "Pink Gorilla," the sharing service 110 retrieves the media item associated with this phrase and sends the media item 106 to the corresponding devices. FIG. 1 illustrates, for instance, that the eBook reader device 108(1) has received the media item 106 from the sharing service 110.

The device 104(1) that sends the original request, the sharing service, and the content rendering devices 108(1)-(S) that receive the shared media item may be configured in numerous ways. Several example configurations are provided below with respect to FIGS. 2-6. However, these are merely examples, and not intended to be limiting.

Example Devices and Sharing Service

Figure 2:
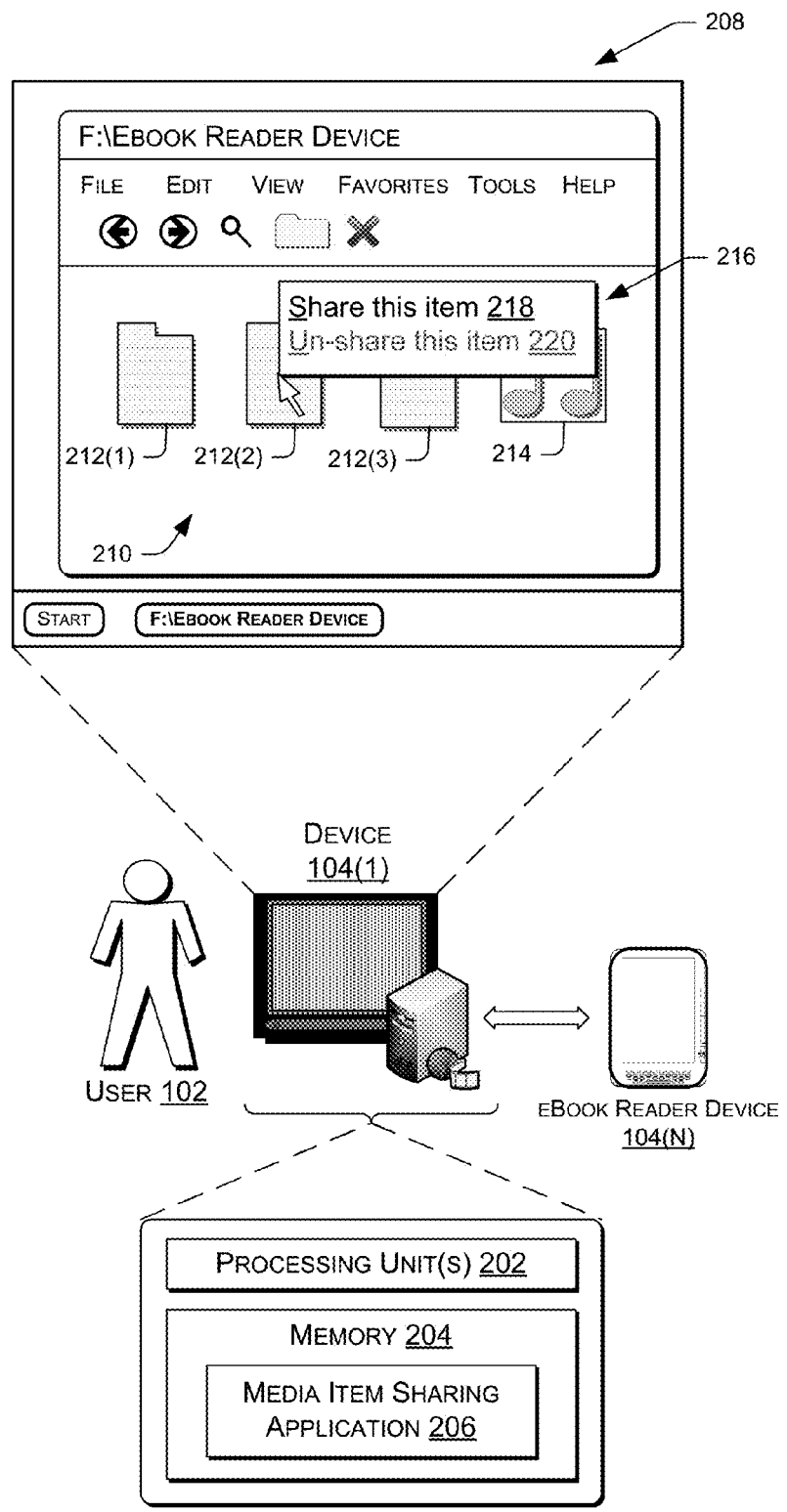
FIGS. 2-4 illustrate user interfaces rendered by the device of the user of FIG. 1. As illustrated, the user employs a sharing application to share a media item stored on an electronic book reader device of the user.

FIG. 2 illustrates example components of the device 104(1) that user 102 employs to share the media item 106 stored on the eBook reader device 104(N) of the user 102. FIG. 2 also illustrates an example user interface rendered by the device 104(1) that facilitates the sharing. As discussed above, while FIG. 2 illustrates the user 102 sharing the media item 106 with use of the device 104(1), the user 102 may also share the media item directly from the eBook reader device 104(N) in other implementations. Furthermore, while FIG. 2 illustrates sharing a media item stored on an eBook reader device, the techniques apply equally to instances where the user 102 shares media items stored on other device types.

FIG. 2 illustrates that the device 104(1) includes one or more processing units 202 and a memory 204, which stores a media item sharing application 206. The media sharing application 206 enables the user 102 to send a request to the sharing service 110 to share an item, such as the media item 106 stored on the eBook reader device 104(N) that is communicatively coupled (wired or wirelessly) to the device 104(1). While FIG. 2 illustrates a client-based application, the user may employ a web-based interface provided by a web-based application in other instances.

As illustrated, the device 104(1) renders a user interface 208 that lists the media items 210 stored on the eBook reader device 104(N). These example items include document 212(1), 212(2) and 212(3), as well as an audio file 214. In this example, the user 102 chooses to share the document 212(2). In response to selecting the document 212(2), the sharing application 206 renders a menu 216 that includes an option 218 to "share this item." When selected, this option 218 sends a request to the sharing service 110 to store the document 212(2) for later access by other devices, such as the content rendering devices 108(1)-(S) of FIG. 1.

As illustrated, the menu 216 may also include an option 220 entitled "un-share this item." In response to selecting this option 220, the device 104(1) sends a request to make a previously shared item unavailable to requesting devices. In response, the sharing service 110 may remove the item from storage 114 of the sharing service or may simply deny later requests for the item. FIG. 2 illustrates this option 220 as grayed out, as the sharing service 110 is not currently sharing the selected document 212(2).

Figure 3:
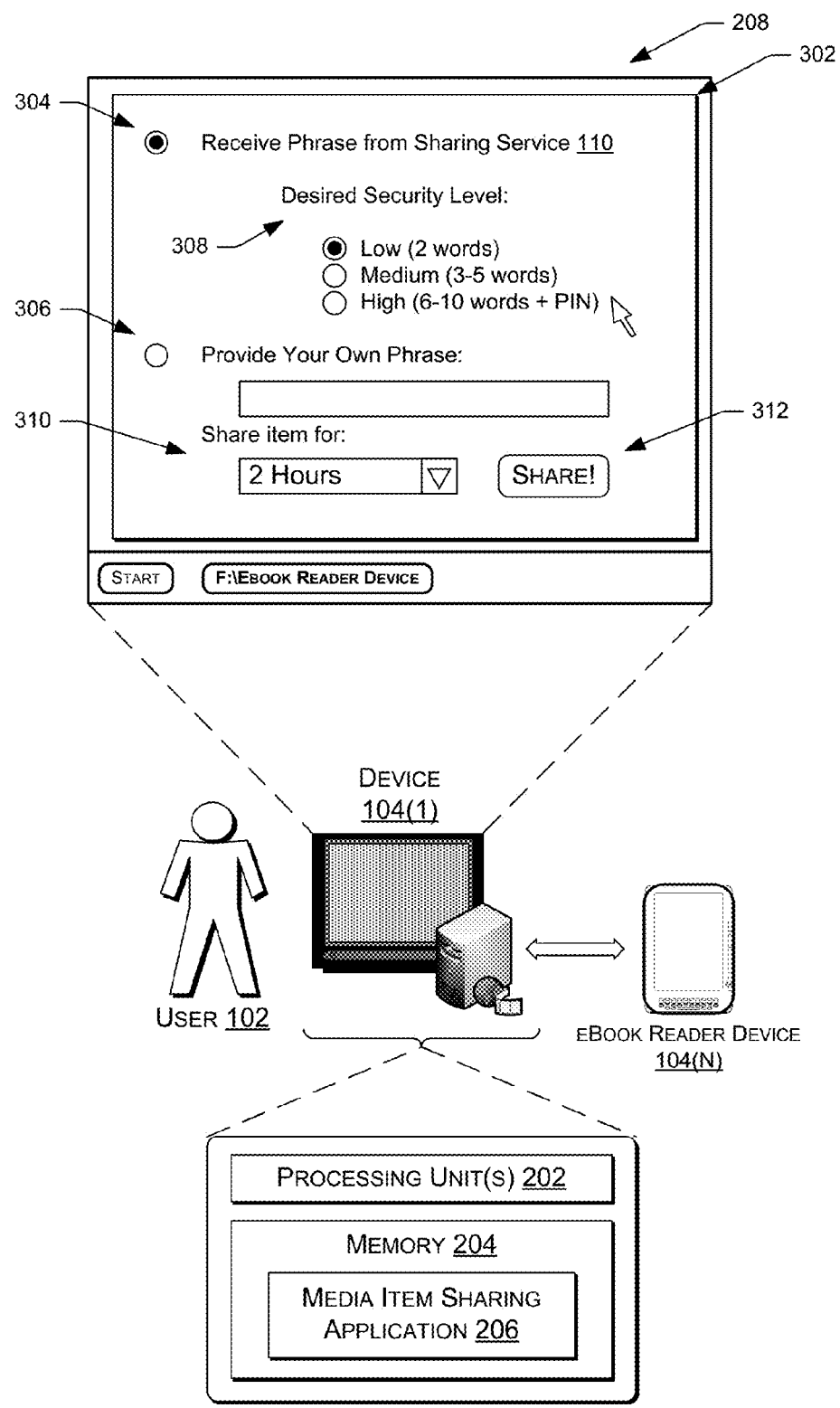

FIG. 3 illustrates a menu 302 provided by the sharing application 206 after the user 102 selects to share the document 212(2) via the menu 216 of FIG. 2. This menu 302 allows the user 102 to choose whether to receive a pass phrase from the sharing service 110 (by selecting option 304) or whether to select a phrase herself (by selecting option 306). In some instances, the device 104(1) and/or the eBook reader device 104(N) may be pre-associated with a pass phrase (e.g., a transaction phrase token), in which case the menu omits any mention of selecting between the option 304 and 306.

In the illustrated example, the user 102 selects the option 304. Here, the menu 302 further allows the user 102 to select a desired level of security 308. In this non-limiting example, the user 102 selects to receive a phrase having a relatively low level of security in lieu of a medium or high level of security. A pass phrase having a relatively higher level of security may consist of more words and/or more complex words than when compared to a pass phrase being relatively less secure.

The user 102 may also elect to receive an additional piece of information (e.g., a numerical PIN) in instances where the user 102 believes that security is of the utmost importance. In these instances, a requesting device must include the pass phrase (e.g., "Pink Gorilla") and the additional piece of information (e.g., "8833") in a request to the sharing service 110 to receive the media item 106. As such, the menu 302 allows the user 102 to decide upon a security level while taking into account the nature of the item being shared, the desired difficulty in remembering the phrase, and other factors.

The menu 302 further allows the user 102 to select an amount of time 310 for which the user 102 desires to share the document 212(2). This time may comprise any length of time, such as five minutes, two hours, two weeks, or any other amount of time, including for an indefinite amount of item. Here, the menu 302 provides a drop-down menu and, hence, a discrete number of time periods to choose from. However, other implementations instead allow the user 102 to enter a custom amount of time, or the sharing service may store the media item for an indefinite amount of time. In the illustrated example, after making the appropriate selections of the options discussed above, the user 102 selects a "Share!" icon 312.

Figure 4:
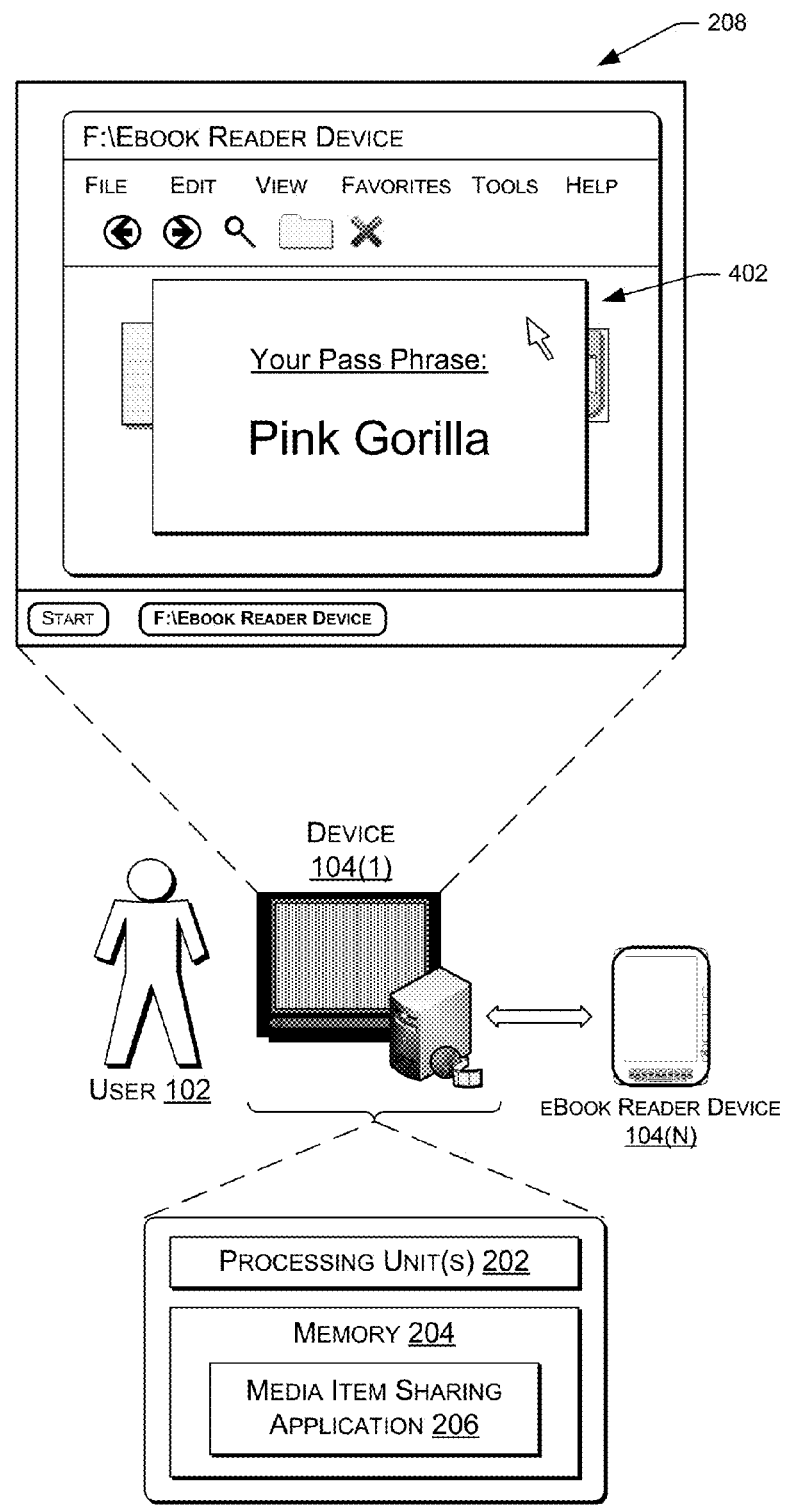

FIG. 4 illustrates the user interface 208 after the user 102 has selected the share icon 312 of FIG. 3. As illustrated, the interface 208 now includes an identification 402 of the pass phrase associated with the request to share the document 212(2). Continuing the example from the above, the identified pass phrase is "Pink Gorilla." While the sharing service 110 provides this pass phrase in this example, the user interface 208 may provide the same or a similar identification of the associated pass phrase when the user 102 provides the phrase. Whether the service 110 or the user 102 selects the phrase, the user 102 shares the associated phrase with those individuals or devices with whom the user 102 desires to share the document 212(2).

Figure 5:
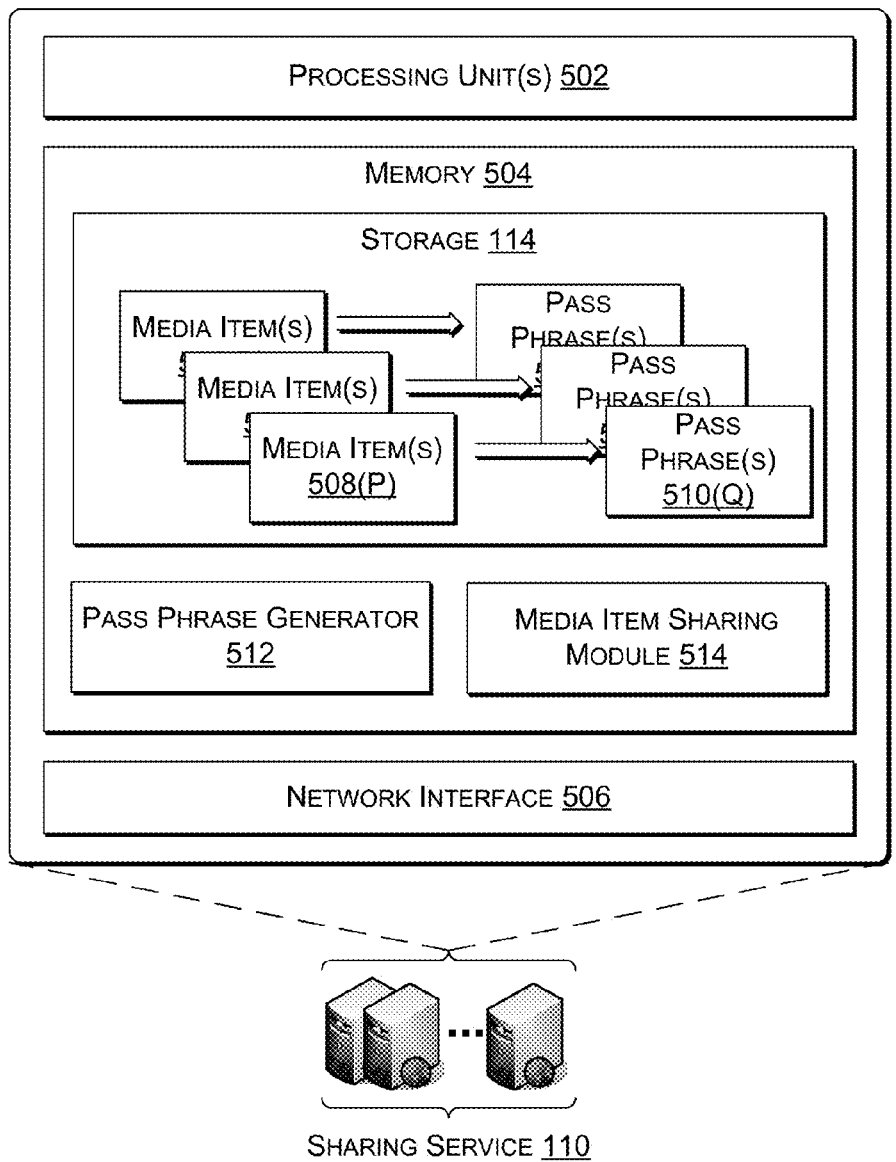
FIG. 5 is a block diagram of selected modules of the sharing service of FIG. 1. This figure also illustrates that the sharing service stores media items, each associated with a respective pass phrase. When an electronic book reader device provides a pass phrase to the service, the service grants access to the corresponding media item to the electronic book reader device.

FIG. 5 illustrates a basic configuration of the sharing service 110. As illustrated, the sharing service 110 includes one or more processing units 502, a memory 504 and a network interface 506. The memory includes the storage 114, which stores media items 508(1), 508(2), . . . , 508(P) that have been received for sharing from client devices, such as the device 104(1) and the eBook reader device 104(N). The memory 504 stores these media items 508(1)-(P) in association with corresponding pass phrases 510(1), 510(2), . . . , 510(Q). For instance, the document 212(2) may be stored in association with the phrase "Pink Gorilla."

The memory 504 also stores, in this example, a pass phrase generator 512, which serves to generate pass phrases for association with shared media items. The generator 512 may generate these phrases in any number of ways, such as by mining corpuses of text for phrases of varying lengths, by combining words according to part-of-speech templates or in any other manner. In some instances, the pass phrase generator 512 generates these pass phrases in a manner similar to the techniques described in U.S. patent application Ser. No. 12/352,970, incorporated in its entirety above.

Finally, the memory 504 includes a media item sharing module 514, which works in tandem with the network interface 506 to communicate with client devices to facilitate item sharing. For instance, the sharing module 514 and the network interface 506 function to receive a share request from a device, store a received media item for sharing and provide an identification of a pass phrase associated with this stored media item. After the media item is stored in association with the pass phrase, the module 514 and the interface 506 may receive a request for an item accompanied by a pass phrase, may determine a media item associated with the phrase and may provide the associated media item to the requesting device.

Figure 6:
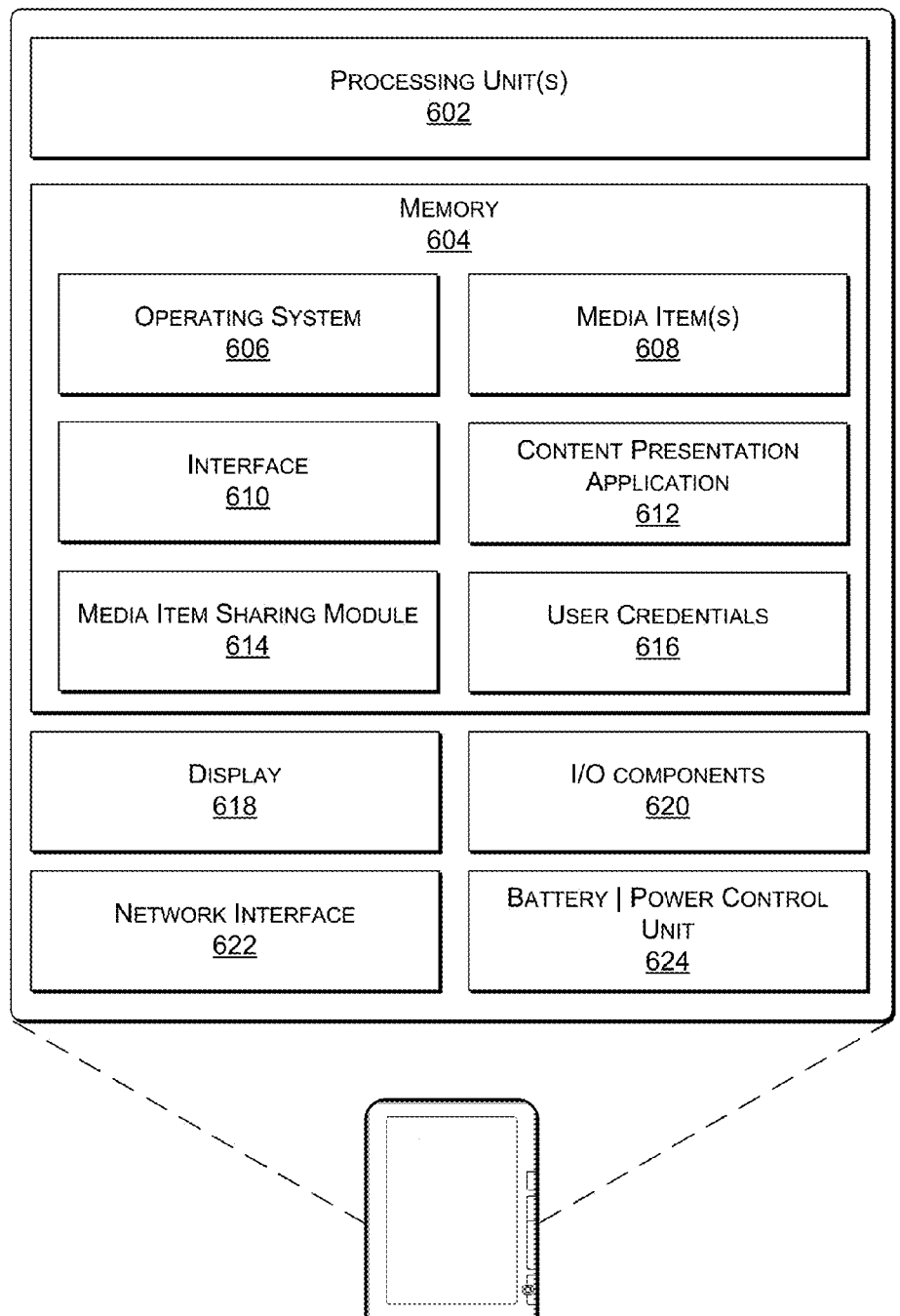
FIG. 6 is a block diagram of selected modules of an electronic book reader device that has received the media item being shared by the user of FIG. 1.

FIG. 6 illustrates example components that might be implemented in the eBook reader device 108(1) that requests and receives the shared media item 106 of FIG. 1. The eBook reader device 104(N) that shares this item may also include these components. In this example, the eBook reader device 108(1) is a dedicated, handheld eBook reader device equipped with a passive display to present electronic documents, such as electronic books or "eBooks". The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. Accordingly, the terms book and/or eBook may include any content that is in electronic or digital form. The eBook reader device 108(1) may present other types of content, such as music, movies and the like.

In a very basic configuration, the device 108(1) includes one or more processing units 602 and memory 604. Depending on the configuration of a dedicated eBook reader device 108(1), the memory 604 (and other memories described throughout this document) is an example of computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the eBook reader device 108(1).

The memory 604 may be used to store any number of functional components that are executable on the processing unit(s) 602, as well as data and media items that are rendered by the eBook reader device 108(1). Thus, the memory 604 may store an operating system 606 and an eBook storage database to store one or more media items 608, such as eBooks and audio books. The memory 604 may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 108(1). Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

An interface module 610 may also be provided in memory 604 and executed on the processing unit(s) 602 to provide for user operation of the device 108(1). One feature of the interface module 610 allows a user to enter a pass phrase into the eBook reader device 108(1) for the purpose of requesting a corresponding shared media item stored on the sharing service 110. The interface module 610 may facilitate textual entry of the pass phrase (e.g., via a keyboard), audible entry of the pass phrase (e.g., via a microphone) or entry of the pass phrase in any other manner. The interface module 610 may provide menus and other navigational tools to facilitate selection and rendering of the media items 608. The interface module 610 may further include a browser or other application that facilitates access to sites over a network, such as websites or online merchants.

A content presentation application 612 renders the media items 608. The content presentation application 612 may be implemented as various applications depending upon the media items. For instance, the application 612 may be an electronic book reader application for rending electronic books, or an audio player for playing audio books, or a video player for playing video, and so forth.

The memory 604 also stores a media item sharing module 614 that is executable on the processing unit(s) to both share a media item and send a request to the sharing service 110 to receive a shared item, as discussed above. The media item sharing module 614 acts in unison with the interface module 610 to receive a pass phrase from a user. When the eBook reader device receives a shared media item, the sharing module 614 stores the item with the other media items 608 stored on the device. The sharing module 614 may also include an indication that the item is a "shared" item, as described and illustrated below with reference to FIG. 11.

The memory 604 may also store user credentials 616. The credentials 616 may be device specific (set during manufacturing) or provided as part of a registration process for a service. The credentials may be used to ensure compliance with DRM aspects of rendering the media items 608.

The eBook reader device 108(1) may further include a display 618. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 108(1) may further be equipped with various input/output (I/O) components 620. Such components may include various user interface controls (e.g., buttons, a joystick, a keyboard, etc.), audio speakers, connection ports, and so forth.

A network interface 622 supports both wired and wireless connection to various networks, such as cellular networks, radio, WiFi networks, short range networks (e.g., Bluetooth), IR, and so forth.

The eBook reader device 108(1) also includes a battery and power control unit 624. The power control unit operatively controls an amount of power, or electrical energy, consumed by the eBook reader device. Actively controlling the amount of power consumed by the reader device may achieve more efficient use of electrical energy stored by the battery.

The eBook reader device 108(1) may have additional features or functionality. For example, the eBook reader device 108(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

General Operation

Figure 7:
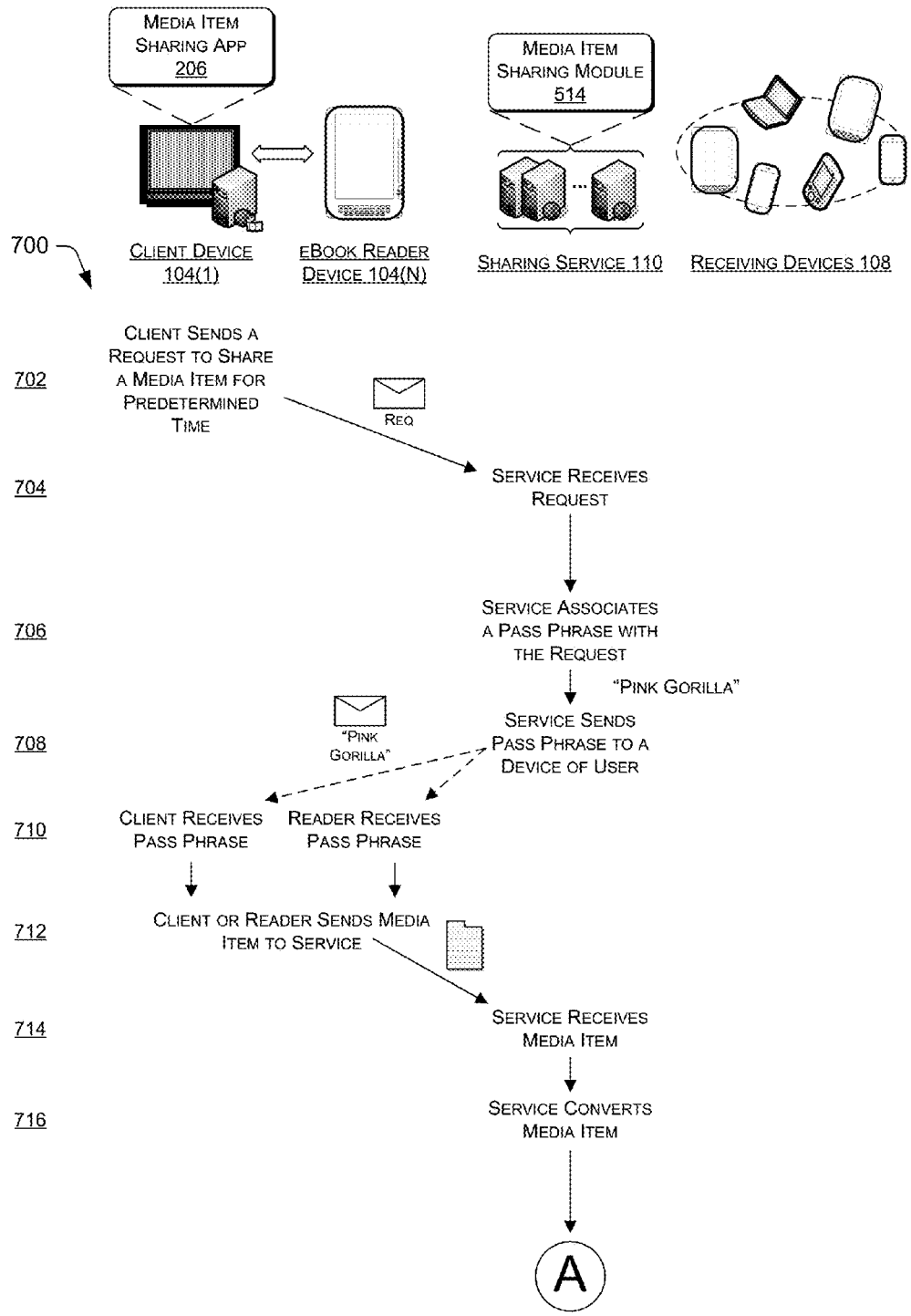
FIGS. 7-9 illustrate a flow diagram showing a process of sharing a media item stored on an electronic book reader device with a group of receiving devices, including elec-
Figure 8:
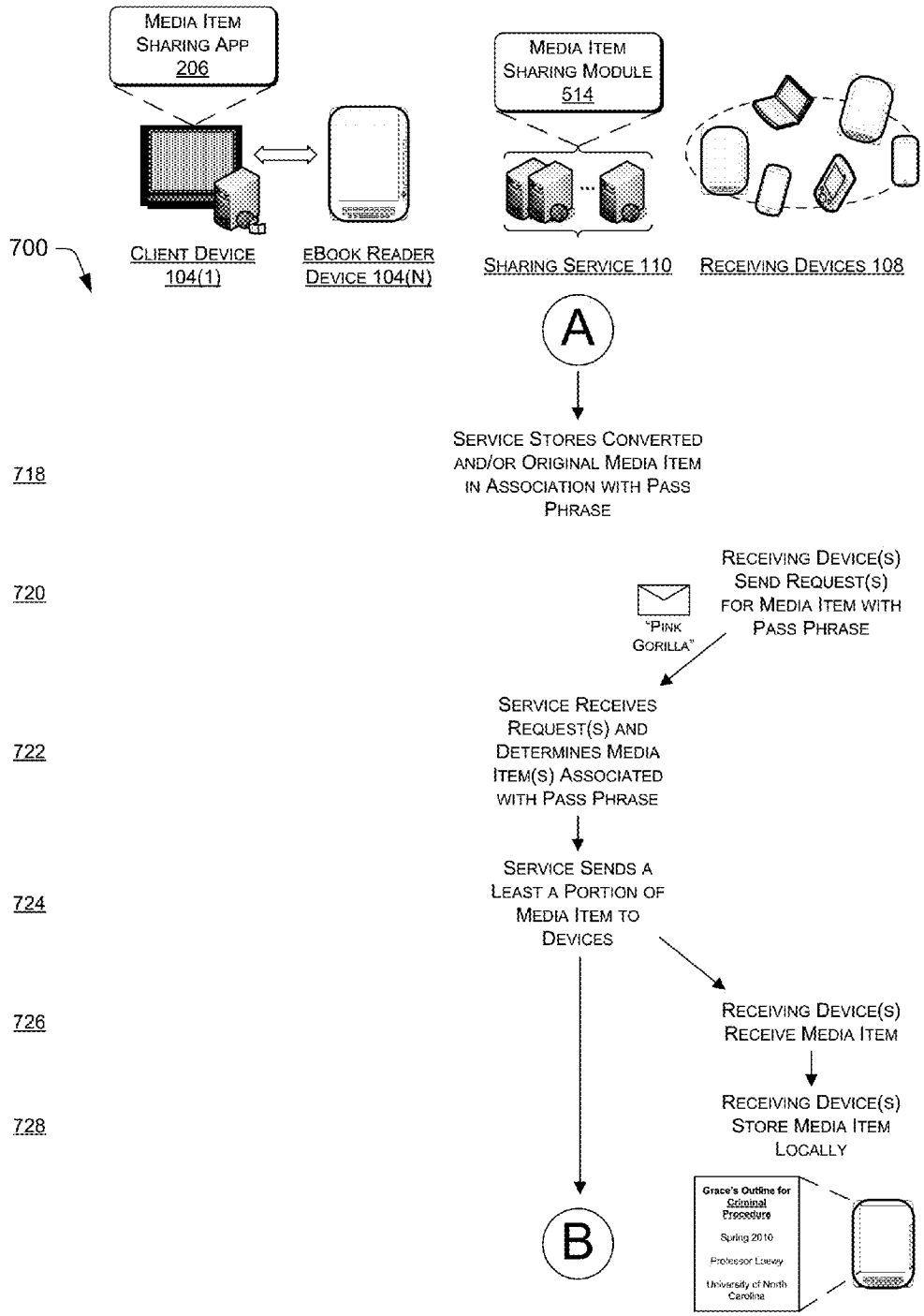
Figure 9:
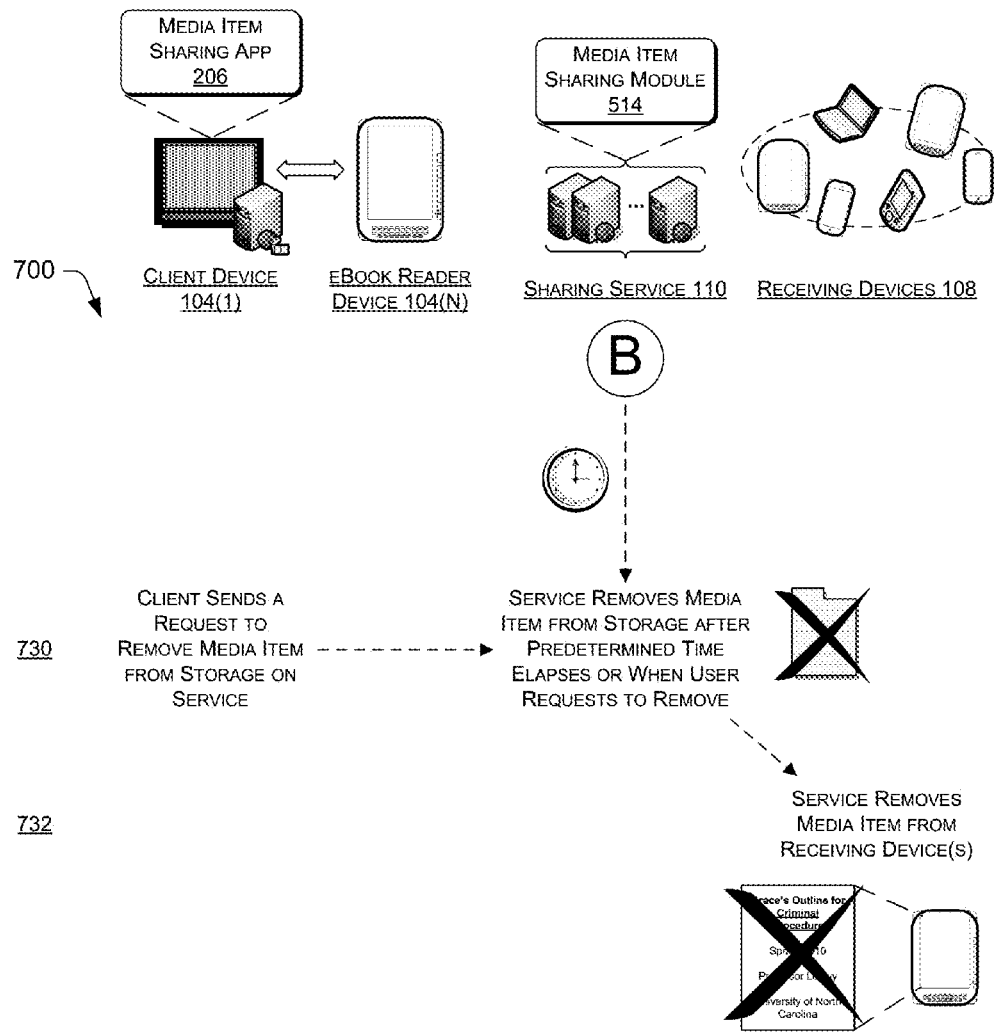

FIGS. 7-9 illustrate a flow diagram showing a process 700 of sharing the media item 106 stored on the eBook reader device 104(N) of FIG. 1 with a group of receiving devices 108(1)-(S) (collectively "receiving devices 108"). These receiving devices include eBook reader devices that provide the pass phrase 124 associated with the shared media item 106. The process 700 (as well as processes described below with respect to FIGS. 15 and 16) is illustrated as a logical flow graph, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 700 (as well as processes 1500 and 1600 below) is described with reference to the architecture 100 of FIG. 1 and the example configurations of FIGS. 2-6. The operations illustrated in FIG. 7 are thus aligned beneath headings indicating operations performed by the entities of FIG. 1.

At 702, the client device 104(1), which is embodied as a desktop computer in this example and is shown connected to the eBook reader device 104(N), sends a request to share a media item for a predetermined amount of time to the sharing service 110. For instance, the user 102 of the client device 104(1) may send a request to share the media item 106 ("Grace's Outline for Criminal Procedure") stored on the eBook reader device 104(N).

At 704, the sharing service 110 receives the request. The sharing service 110 then associates a pass phrase with this request, such as the pass phrase "Pink Gorilla," at 706. The service 110 may generate and/or select this phrase in some instances, while the user 102 may select this phrase in other instances. At 708, the sharing service 110 sends the pass phrase to the client device 104(1) and/or to the eBook reader device 104(N). In either instance, the user 102 receives an identification of the pass phrase at 710.

At 712, the client device 104(1) or the eBook reader device 104(N) sends the media item 106 to be shared to the sharing service 110. In some instances, the eBook reader device 104(N) provides the item to the client device 104(1), which then uploads the media item 106 to the sharing service 110. In other instances, the eBook reader device 104(N) uploads the media item 106 directly to the sharing service 110 (e.g., via a cellular or WiFi network).

In each instance, the sharing service 110 receives the item at 714. In this example, the sharing service 110 receives the media item 106 in a format that is not compatible with an eBook reader device that may later access the item. Therefore, at 716, the sharing service 110 converts the media item to a format that is compatible with the eBook reader device that may later access the item. In some instances, the sharing service 110 may convert the received media item 106 to multiple different formats, each corresponding to a particular format preferred by a particular device (e.g., a cellular phone, a PDA, different types of eBook reader devices, etc.).

FIG. 8 continues the illustration of the process 700 and includes, at 718, storing the converted and/or the original received media item 106 in the storage 114 of the service 110. At this point, the sharing service 110 makes the media item available to devices that provide the pass phrase 124 associated with the media item 106 within the specified predetermined amount of time.

At 720, one or more devices, including an eBook reader device 108(1), send a request for the media item accompanied by the pass phrase 124, "Pink Gorilla." At 722, the sharing service 110 receives the request(s) and determines one or more media items that are associated with the pass phrase. In the instant example, the sharing service 110 determines that the phrase "Pink Gorilla" is associated with a single item, namely the media item 106. The sharing service 110 then sends at least a portion of the media item 106 to the requesting devices at 724.

In some implementations, the sharing service 110 may take into account the capabilities and features (e.g., native applications, screen size, etc.) of a receiving device when determining which version of the media item to send to the respective receiving device. For instance, the sharing service 110 may receive a request for a media item from a receiving device that is able to render a format of the media item in its original form, while also receiving a request for the media item from a receiving device that is not able to render that format. In this example, the sharing service 110 may send the media item in the original format to the former device while sending a modified or converted format of the media item to the latter device.

In the instant example where the media item 106 comprises a personal document of the user 102, the sharing service 110 may provide the entire item. In other instances, however, the sharing service 110 may provide less than the entire item. For instance, when the shared media item comprises a copyrighted work, such as an eBook, the sharing service 110 may share a sample of the eBook in lieu of the entire book. The sharing service 110 or the book publisher may predetermine which portion of the book share (e.g., Chapter 1 of the book). In other instances, however, the user 102 may specify which portion of the eBook to share (e.g., the portion currently accessed by the eBook reader device 104(N) of the user). In instances where the shared media item 106 comprises an article in a periodical, meanwhile, the sharing service 110 may provide some or the entire article along with a free trial offer for the periodical and/or a request to subscribe to the periodical. While a few examples have been discussed and are illustrated in greater detail below, multiple other sharing scenarios exist.

At 726, the receiving device(s), including the eBook reader device 108(1), receive the media item 106. At 728, these devices store the media item 106 in a local storage of the respective device. At this point, each receiving device may render the received portion of the shared media item 106, as FIG. 8 illustrates.

FIG. 9 continues the process 700 and includes, at 730, the sharing service 110 removing the media item from the storage 114 on the sharing service 110. The sharing service 110 may do so in response to: (1) determining that the predetermined amount of time that the user 102 desired to share the document has elapsed, or (2) receiving a request from the user 102 to "un-share" or remove the media item 106 prior to the expiration of the predetermined amount of time. In either instance, when the sharing service 110 removes the media item 106 from the storage 114, the media item 106 is no longer available to devices that send the pass phrase 124 to the sharing service 110. Finally, at 732, the sharing service 110 may (or may not) remove the media item 106 from the devices that previously received the item, such as the eBook reader device 108(1), in response to removing the item from the storage 114 of the sharing service 110.

The process 700 illustrates but one example of how the architecture 100 of FIG. 1 may be leveraged to share media items amongst devices, such as eBook reader devices. Furthermore, various details of the usage scenarios discussed above are provided below with reference to FIGS. 10-14. However, these examples are non-limiting and the architecture 100 may be used to support other configurations and usage scenarios.

Example eBook Reader Device User Interfaces

Figure 10:
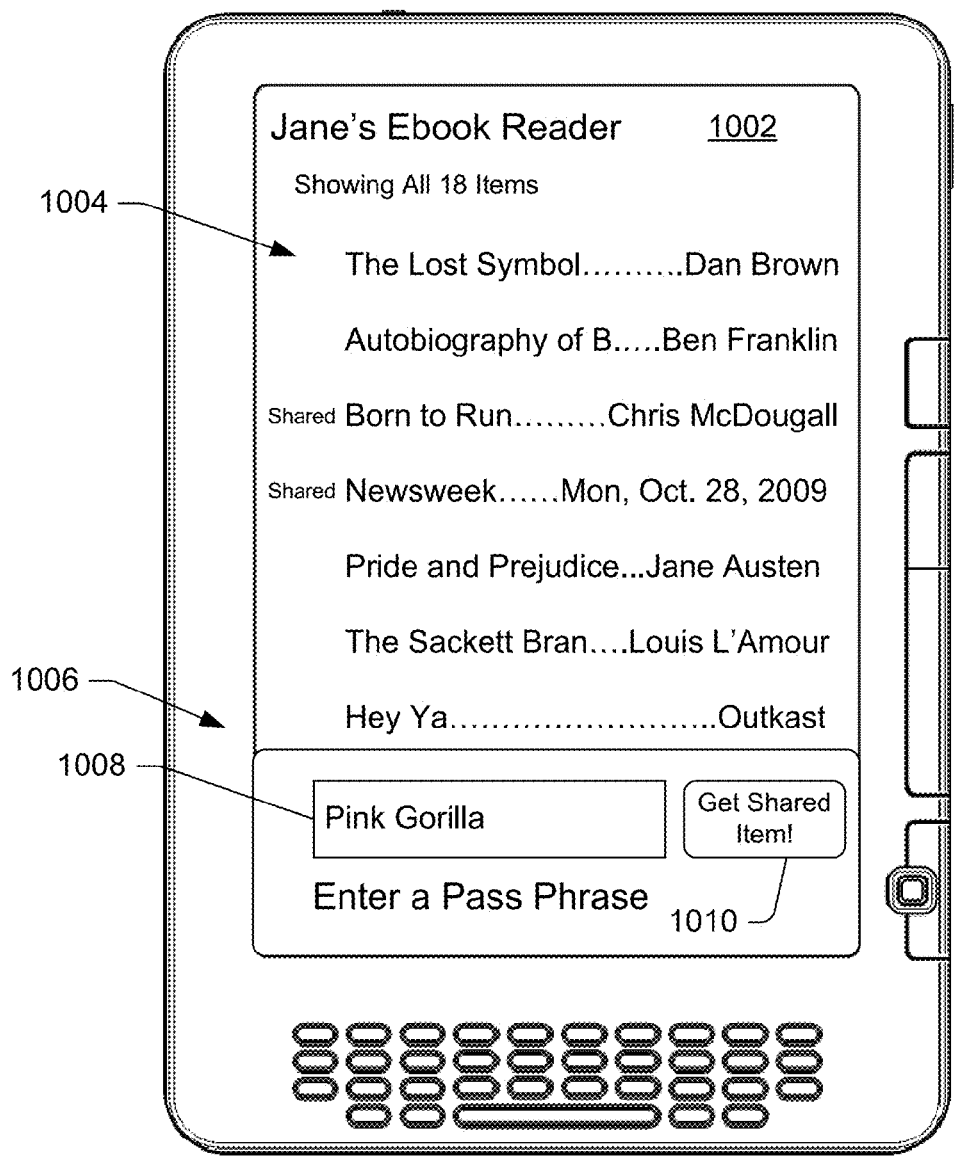
Figure 11:
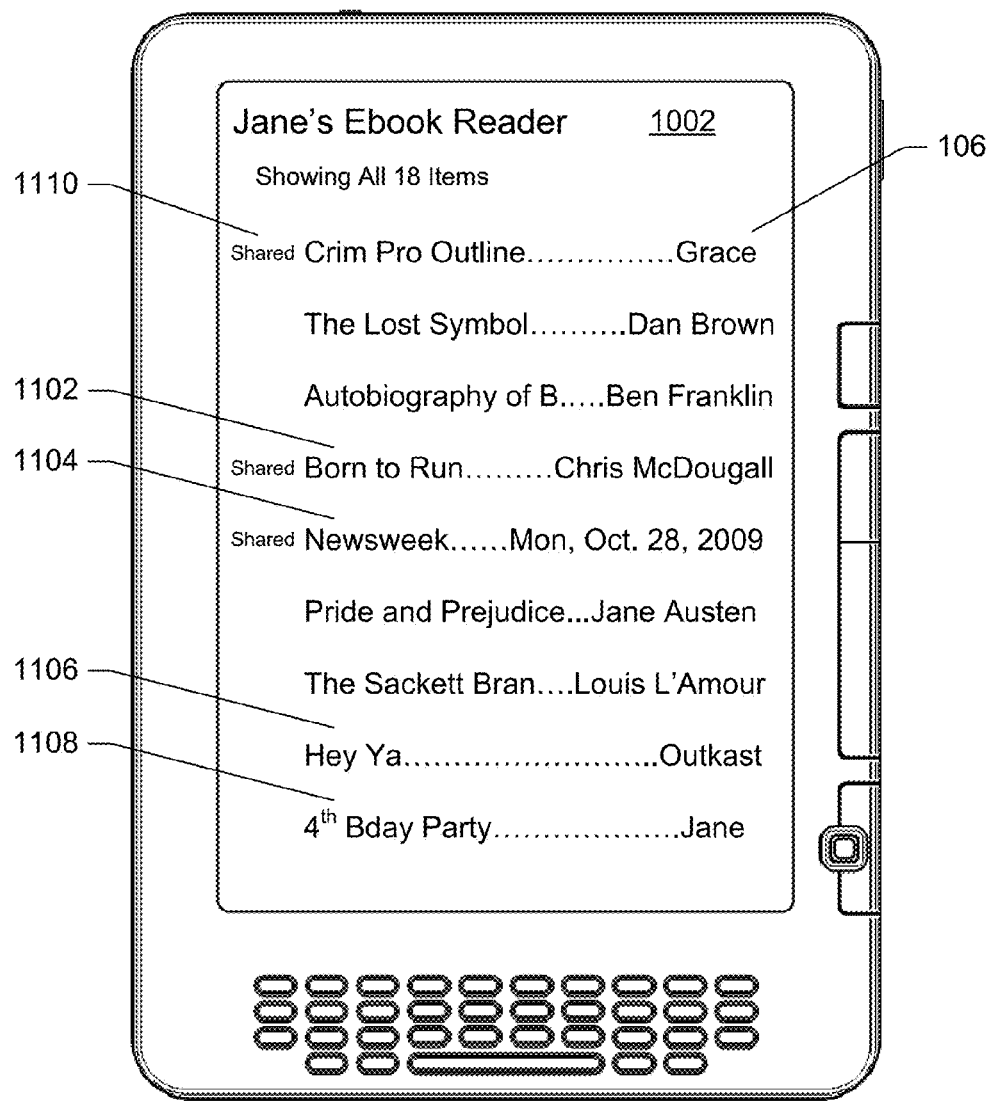

FIGS. 10-11 illustrate example user interfaces that the eBook reader device 108(1) (and the other eBook reader devices of architecture 100) may render in association with the process 700 described above. First, FIG. 10 illustrates a user interface 1002 that facilitates entry of a pass phrase for the purpose of submitting the pass phrase 124 to the sharing service 110 to receive the shared media item 106. The user interface 1002 may be similarly employed to enter any other pass phrase associated with any other media item that the sharing service 110 stores.

As illustrated, the user interface 1002 includes a listing of media items 1004 currently stored on or accessible by the eBook reader device 108(1). In addition, the user interface 1002 includes an interface 1006 that facilitates entry of the pass phrase 124. While this example interface 1006 comprises a user interface that facilitates textual entry of a pass phrase, other implementations may employ other interfaces that facilitate entry of pass phrases in other ways (e.g., audibly). In this example, the user of the eBook reader device 108(1) enters the pass phrase "Pink Gorilla" into a text box 1008 and then selects an example icon 1010 entitled "Get Shared Item!" At this point, the eBook reader device 108(1) sends a request to the sharing service for the media item 106 associated with the pass phrase, "Pink Gorilla."

FIG. 11 illustrates the user interface 1002 of the eBook reader device 108(1) after the device has received the shared media item 106 from the sharing service 110. The user interface 1002 again lists the media items 1004 stored on the eBook reader device 108(1), including the shared media item 106 just received from the sharing service 110. As illustrated, the eBook reader device 108(1) stores a variety of different media items, including a personal document (embodied as the media item 106), an eBook 1102 ("Born to Run" by Christopher McDougall), a periodical 1104 ("Newsweek"), an audio file 1106 ("Hey Ya" by Outkast) and a video file 1108 ("4$^{th}$ Bday Party").

In addition, the user interface 1002 includes an indication 1110 of which media items are shared media items. Shared media items are those items that the eBook reader device 108(1) has received from the sharing service 110 and/or those items that the device 108(1) has shared with others via the sharing service 110. FIG. 11 illustrates that the eBook reader device 108(1) has received the media item 106 from the sharing service 110, as discussed above with reference to the process 700.

Example Sharing Configurations

Figure 12:
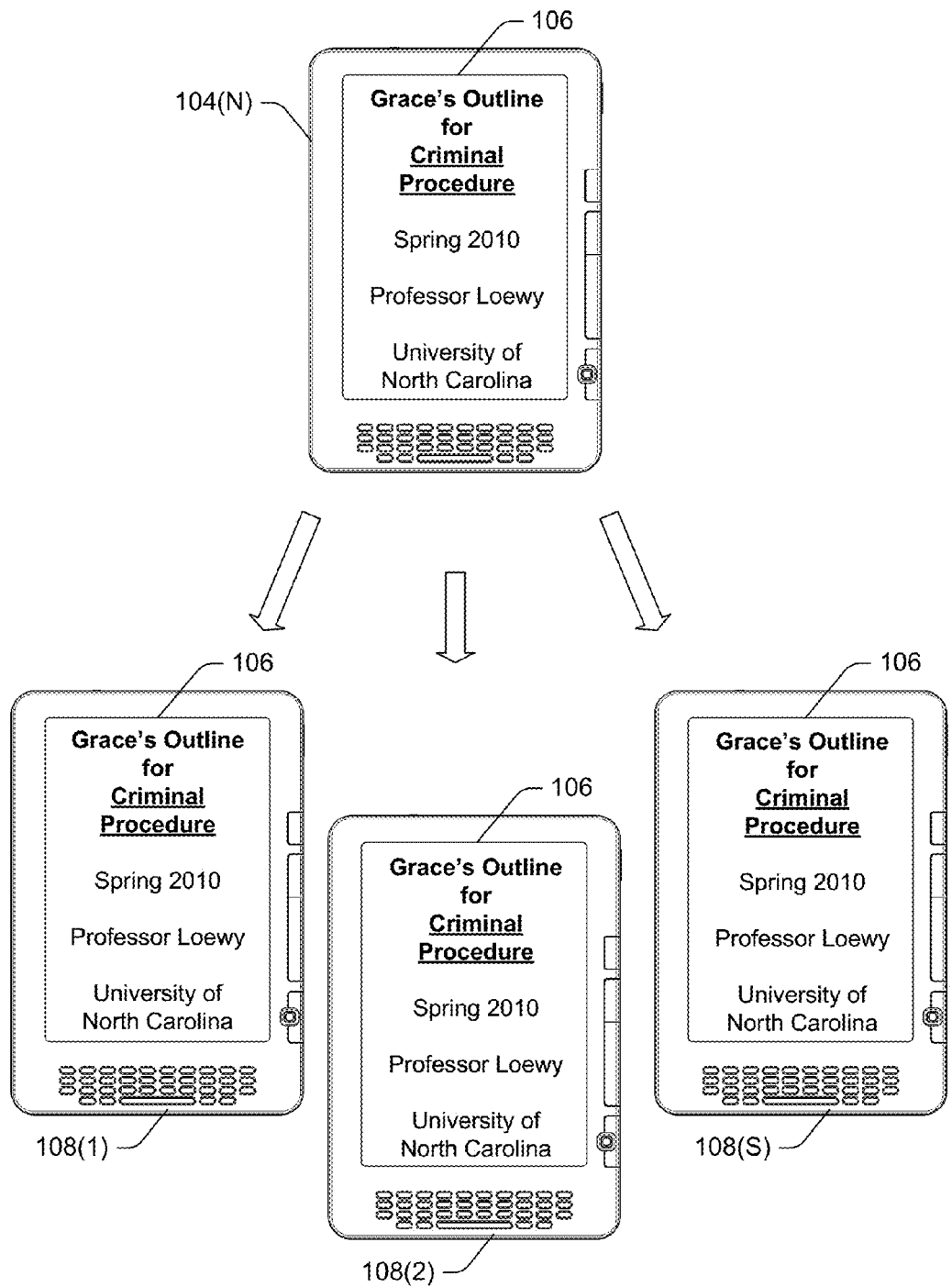
Figure 13:
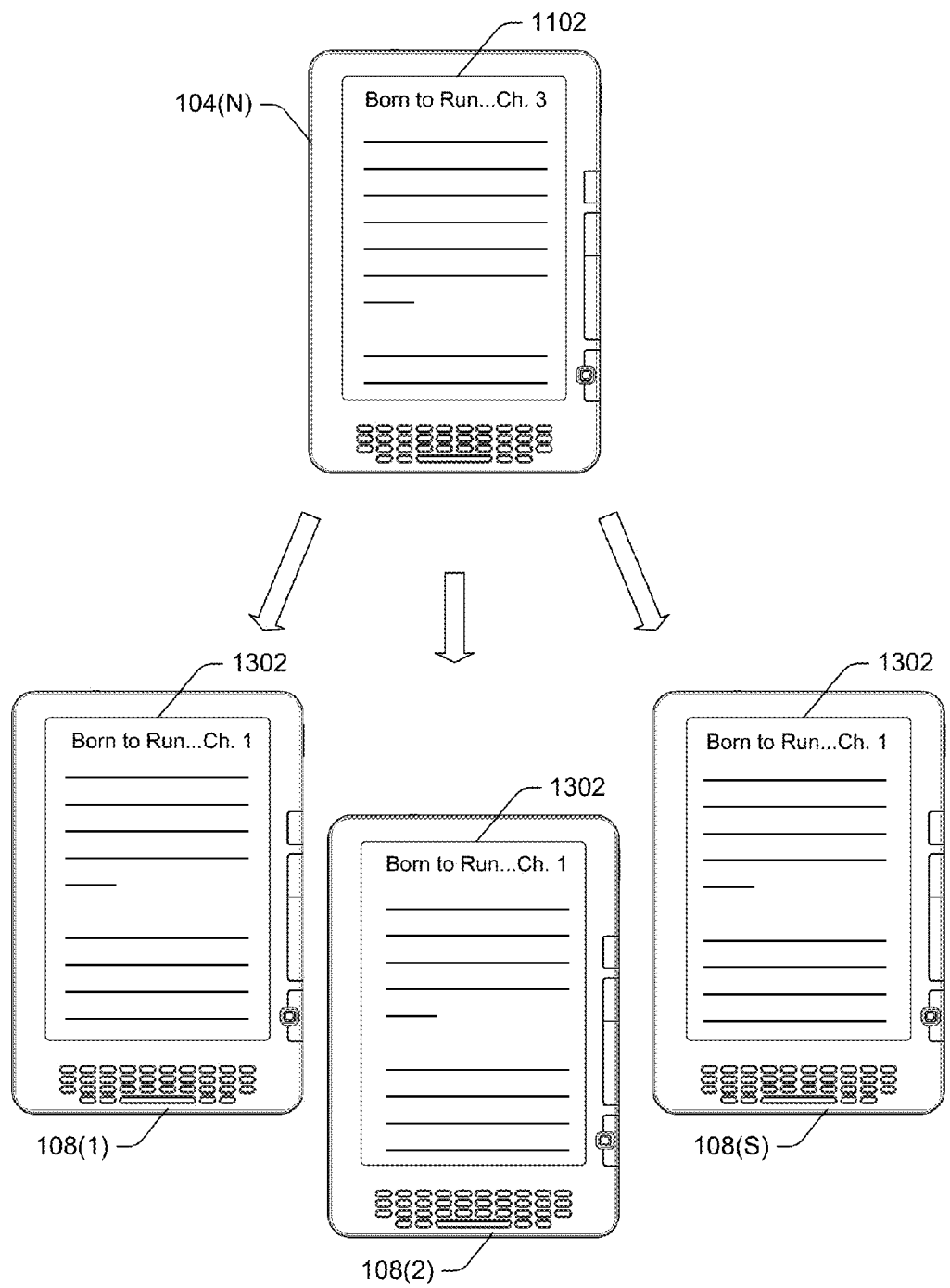
Figure 14:
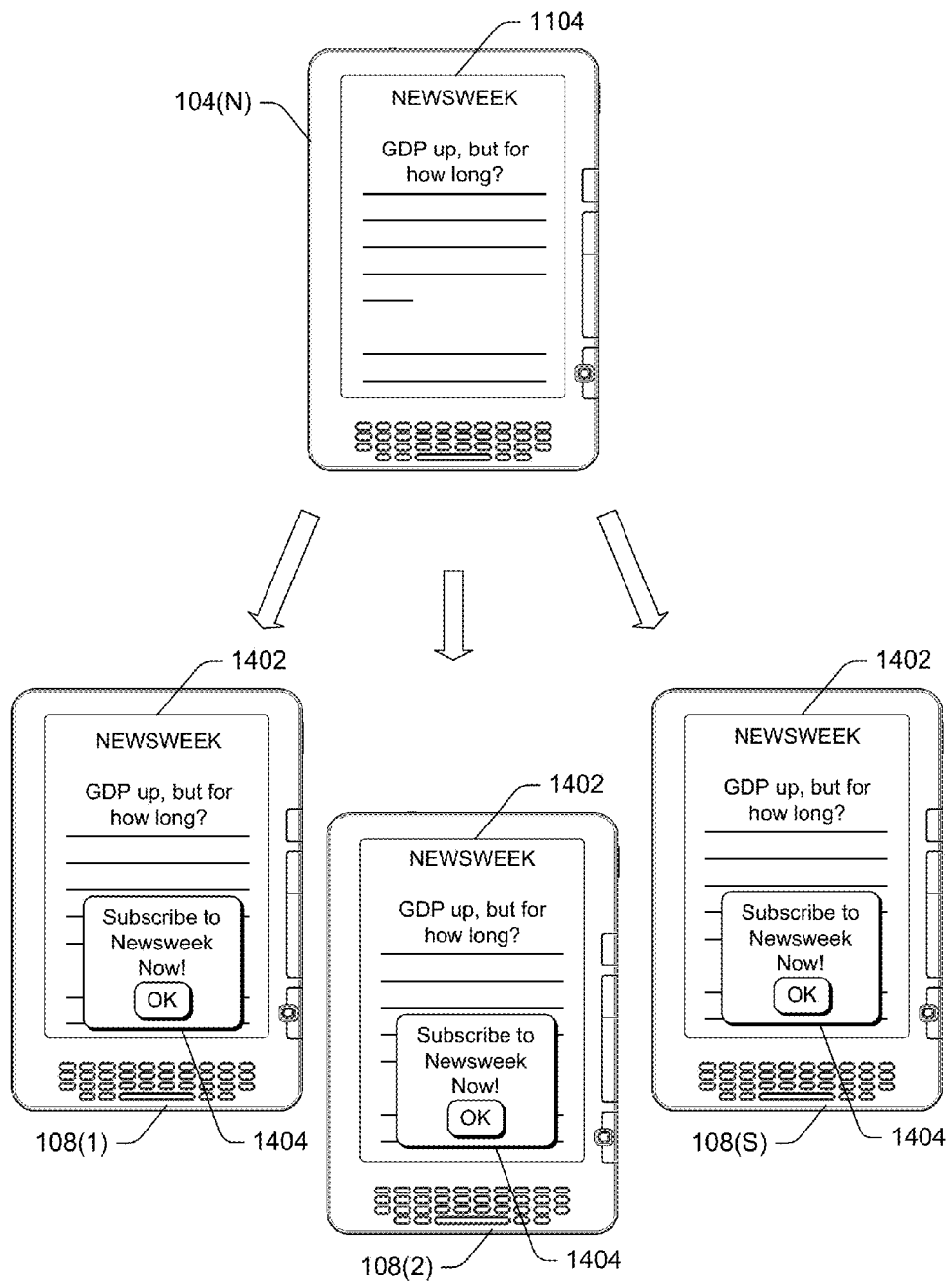

FIGS. 12-14 illustrate several example sharing configurations. While a few are illustrated and described, multiple other sharing configurations are possible and envisioned. FIG. 12 illustrates a configuration in which the eBook reader device 104(N) of FIG. 1 shares a personal document with multiple content rendering devices 108(1)-(S) (including other eBook reader devices) of FIG. 1 via the sharing service 110. Because the shared item here comprises a personal document created by the user 102, the user 102 and the sharing service 110 may share the entire media item 106 with the eBook reader devices 108(1), 108(2), and 108(S).

FIG. 13, meanwhile, illustrates a configuration in which the eBook reader device 104(N) shares a portion of the eBook 1102 of FIG. 11 with the eBook reader devices 108(1), 108(2), and 108(S) via the sharing service 110. As discussed above, because the eBook 1102 comprises a copyrighted work, when the user 102 requests to share the eBook 1102 with the other devices, the sharing service 110 may share a sample 1302 of the eBook 1102 in lieu of the entire book. In these instances, the sharing service 110 or the book publisher may determine which portion of the book to share. In the illustrated example, for the instance, the sample 1302 comprises the first chapter of the book. In other instances, meanwhile, the user 102 may specify the sample of the book to be shared (e.g., by sharing the portion that the user 102 currently reads, by specifying invariant reference points in the eBook, etc.).

FIG. 14 illustrates a configuration in which the eBook reader device 104(N) shares an article 1402 in the periodical 1104 from FIG. 11 with the eBook reader devices 108(1), 108(2), and 108(S) via the sharing service 110. Here, in addition to sharing the article 1402, the sharing service 110 offers each user of the eBook reader devices 108(1), 108(2), and 108(S) the opportunity to subscribe to the periodical 110 via pop-up box 1404. The sharing service 110 and/or the publisher of the periodical may also offer a trial subscription or the like.

Example Processes

Figure 15:
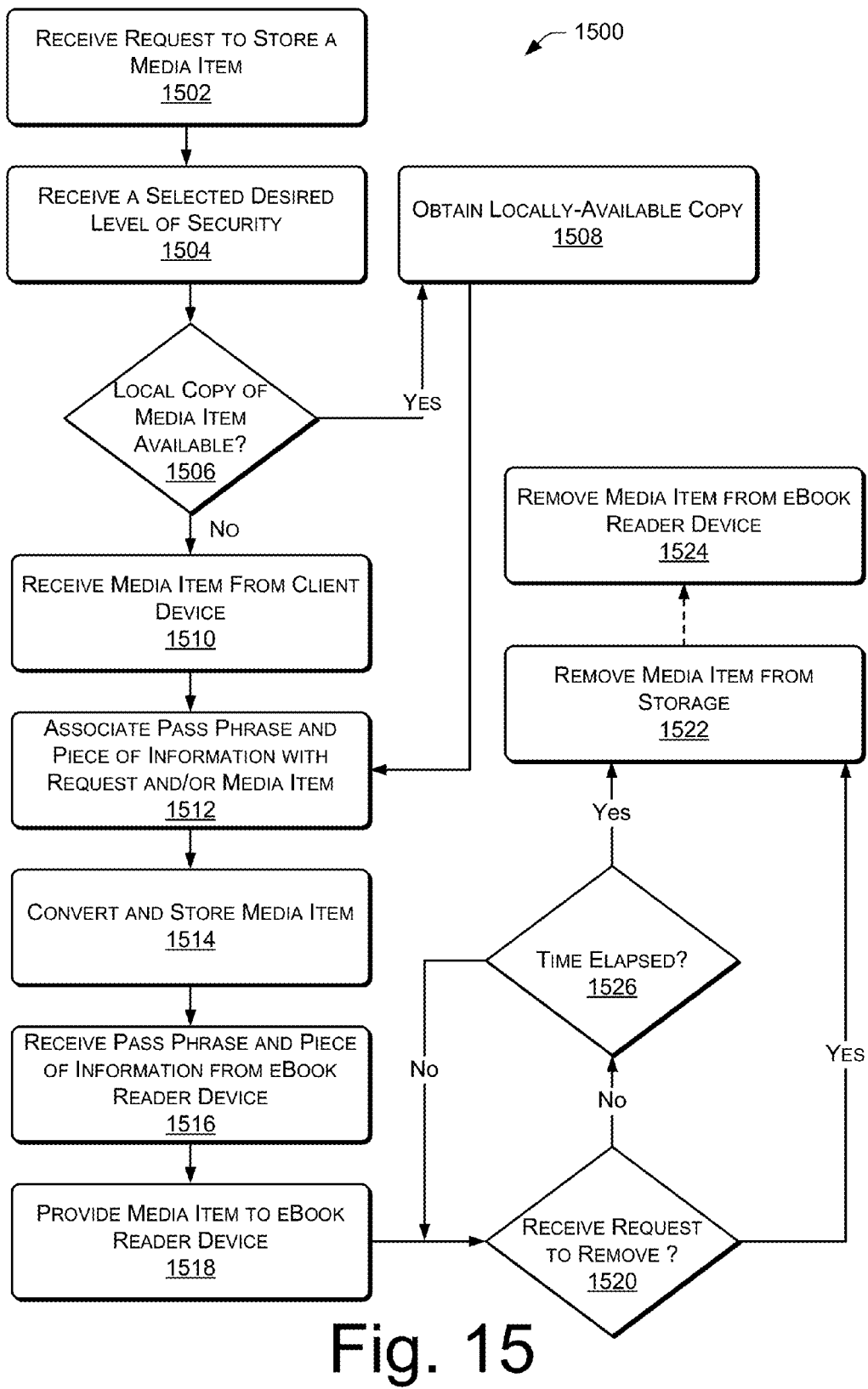
Figure 16:
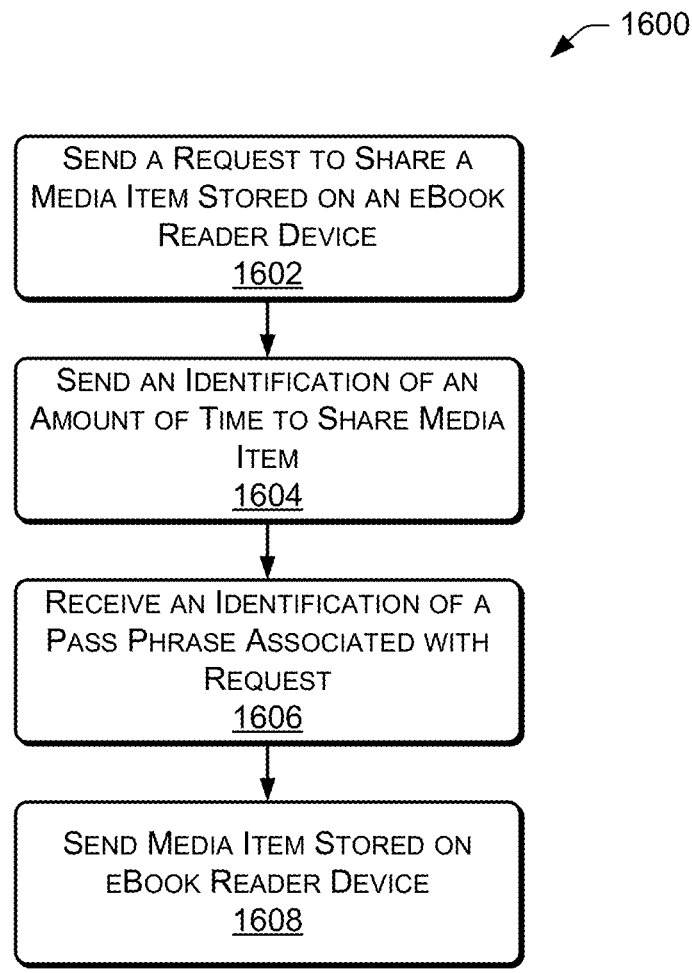

FIGS. 15-16 illustrate example processes for implementing the sharing techniques described above. Again, while these processes are described with reference to the architecture 100 of FIG. 1, these processes may apply equally in a variety of other architectures.

FIG. 15 first illustrates a process 1500, which includes the sharing service 110 receiving a request to store a media item for a predetermined amount of time at 1502. In addition, the sharing service 110 receives a desired level of security associated with the request at 1504.

In response, the sharing service 110 may determine, at 1506, whether a local copy of the media item is available to the sharing service 110. For instance, the sharing service request and receive a checksum of the media item from the requesting device in order to compare this checksum to the media items that the sharing service 110 already stores or has local access to. Conversely, if the item to be shared is an eBook or the like, then the sharing service may request and receive a unique identifier (e.g., an ISBN number) associated with the item. Again, the sharing service 110 may then compare this identifier to those media items already available to the sharing service to determine if the item to be shared is amongst these available items. The sharing service may also make the determination of 1506 in many other ways.

In response to determining that a local copy of the item is available, the sharing service 110 obtains a locally-available copy of this media item at 1508. If not, then the sharing service 110 receives the media item to be shared from the requesting device at 1510 (possibly in response to a request from the sharing service 110).

At 1512, the sharing service associates a pass phrase and/or an additional piece of information (e.g., a numerical PIN) with the request and/or the media item. The size and complexity of the pass phrase may depend upon the desired level of security, as may the inclusion or exclusion of the additional piece of information. At 1514, the sharing service 110 converts the item to a format that is compatible with an eBook reader device and stores the converted and/or the original item.

At 1516, the sharing service 110 receives the pass phrase and the additional piece of information from an eBook reader device, such as the eBook reader device 108(1) described above. The sharing service 110 then provides the media item to the eBook reader device at 1518. Providing the item may include downloading the item, streaming the item, providing a pointer to the item stored at another location or the like.

At 1520, the sharing service 110 queries whether the service has received a request to remove the media item from the user that originally shared the item. If so, then the sharing service 110 removes the media item 106 from the storage 114 at 1522. In other instances, the sharing service 110 may simply refrain from further sharing of the item in lieu of removing the item from the storage 114. Furthermore, in some instances, the sharing service 110 may (or may not) also remove the item from the eBook reader device that received the item at 1518. This removal is represented at 1524.

If, however, the sharing service 110 has not received a request to remove the item, then the service 110 queries whether the predetermined amount of time has elapsed at 1526. If not, then the process 1500 returns to the query of 1520. If so, then the sharing service 110 removes the media item from the storage 114. Again, the sharing service 110 may (or may not) also remove the item from the eBook reader device that received the item at 1518.

FIG. 16 illustrates a process 1600 that the client device 104(1) and/or the eBook reader device 104(N) of FIG. 1 may implement for the purpose of sharing a media item via the sharing service 110. At 1602, the device 104(1) or 104(N) sends a request to the sharing service 110 to share a media item stored on the eBook reader device 104(N). At 1604, the device 104(1) or 104(N) sends an identification of an amount of time for which the sharing service 110 should share the item.

The device 104(1) or 104(N) then receives, at 1606, an identification of a pass phrase associated with the request from the sharing service 110. The service 110 may have associated the phrase with the request after generating and/or selecting the phrase or after receiving the phrase from the device 104(1) or 104(N). Finally, at 1608, the device 104(1) or 104(N) sends the media item to be shared to the sharing service 110 for sharing with those devices that provide the pass phrase to the sharing service 110 within the predetermined amount of time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
  a display;
  one or more processors;
  memory storing computer-readable instructions that, when executed by the one or more processors, cause the one or more processors to:
  provide an indication on the display that a different electronic device has shared a media item on a server, the media item being available on the server in a first media format;
  receive, via a user interface of the electronic device, a pass phrase associated with the media item;
  provide the pass phrase to the server;
  receive from the server, in response to the pass phrase being provided to the server, a portion of the media item in a second media format that is compatible with the electronic device, wherein the portion of the media item is converted to the second media format by the server;
  store the portion of the media item in the memory;
  render the portion of the media item on the display prior to receipt of a removal message;
  receive the removal message at an expiration of a predetermined amount of time; and
  remove the portion of the media item in response to the removal message.

2. The electronic device of claim 1, wherein the user interface is configured to receive the pass phrase via textual or audible entry.

3. The electronic device of claim 1, further storing the computer-readable instructions that, when executed, cause the one or more processors to:
  receive, via the user interface, an indication requesting an additional piece of information prior to receiving the portion of the media item from the server.

4. The electronic device of claim 3, wherein the additional piece of information includes a numerical personal identification number (PIN).

5. The electronic device of claim 1, wherein:
  the media item includes non-copyrighted material; and
  the portion of the media item includes any or all of the media item.

6. The electronic device of claim 1, wherein:
  the media item includes copyrighted material; and
  the portion of the media item includes a sample of the copyrighted material.

7. The electronic device of claim 6, wherein:
  the copyrighted material includes an electronic book comprising a plurality of chapters; and
  the portion of the media item includes a particular chapter of the plurality of chapters of the electronic book.

8. The electronic device of claim 6, wherein:
  the copyrighted material includes a periodical comprising a plurality of articles; and
  the portion of the media item includes at least a portion of a particular article of the plurality of articles of the periodical.

9. The electronic device of claim 8, further storing the instructions that, when executed, cause the one or more processors to provide at least one of an offer for a free trial subscription to the periodical or a request to subscribe to the periodical.

10. The electronic device of claim 1, further storing the computer-readable instructions that, when executed, cause the one or more processors to:
  provide an indication on the display that the different electronic device has shared the media item for the predetermined amount of time.

11. The electronic device of claim 1, wherein the portion of the media item corresponds a particular portion of the media item previously accessed by the different electronic device.

12. A method comprising:
  receiving, at a server and from a first electronic device, a media item in a first media format for sharing the media item with a second electronic device;
  receiving, at the server and from the first electronic device, a first indication identifying a particular security level of a plurality of security levels associated with access to the media item;
  receiving, at the server and from the first electronic device, a request for additional authentication information being supplied from the second electronic device for accessing the media item;
  generating, by the server, a pass phrase that allows the access to the media item, wherein a complexity of the pass phrase is based at least in part on the particular security level;
  causing, by the server, a presentation of a third indication on a display of the second electronic device, the third indication identifying the media item along with a request for the pass phrase and the additional authentication information to access the media item;
  receiving, by the server via an interface of the second electronic device, the pass phrase and the additional authentication information to access the media item;
  transmitting, by the server, in response to receiving at least the pass phrase and the additional authentication information, the media item to a memory of the second electronic device in a second media format to enable the second electronic device to render the media item prior to receipt of a removal message; and
  transmitting, by the server, the removal message to the second electronic device at an expiration of a predetermined amount of time, the removal message to cause the second electronic device to remove the media item from the memory of the second electronic device.

13. The method of claim 12, further comprising, receiving, by the server via the interface of the second electronic device, a recording of the pass phrase via a microphone from the second electronic device.

14. The method of claim 12, further comprising, receiving, at the server, an indication of the period of time to share the media item with the second electronic device.

15. The method of claim 12, wherein the media item corresponds to an electronic book, and the first electronic device is associated with a user that has purchased the electronic book, and further comprising;
  receiving, at the server and from the first electronic device, an indication of a portion of the electronic book to share with the second electronic device, the portion of the electronic book being previously accessed by the first electronic device; and
  in response to receiving the pass phrase and the additional authentication information, transmitting, by the server, the portion of the electronic book to the memory of the second electronic device.

16. The method of claim 12, further comprising,
receiving, at the server, an additional indication that an additional electronic device receives the media item; and
in response to receiving, by the server via the interface of the second electronic device, the pass phrase and the additional authentication information to access the media item, transmitting by the server, the media item to a memory of the second electronic device.

17. A system comprising:
one or more processors;
memory storing computer-readable instructions that, when executed by the one or more processors, cause the one or more processors to:
  receive a media item and a first indication from a first electronic device, the media item being in a first media format, and the first indication including a particular security level to associate with access to the media item;
  generate a pass phrase that allows access to the media item, wherein a complexity of the pass phrase is based at least in part on the particular security level;
  send, to the first electronic device, a second indication that includes the pass phrase;
  receive, from a second electronic device, the pass phrase;
  provide, to the second electronic device, in response to receiving the pass phrase, access to the media item in a second media format that is compatible with the second electronic device, the second media format being different from the first media format, the access granting temporary permission for the second electronic device to render the media item prior to receipt of a removal message; and
  provide, to the second electronic device, the removal message at an expiration of a predetermined amount of time, the removal message to cause the second electronic device to remove the media item from memory of the second electronic device.

18. The system of claim 17, wherein the memory further stores the computer-readable instructions when executed by the one or more processors, causing the system operable to:
  receive an input from the first electronic device that specifies the predetermined amount of time.

19. The system of claim 17, wherein the pass phrase comprises of one or more words; and
  wherein to generate the pass phrase further includes the computer-readable instructions that, when executed on the one or more processors, cause the one or more processors to:
  determine a number of words for the pass phrase, based at least in part on the particular security level.

20. The system of claim 17, wherein the pass phrase comprises of a predetermined number of words; and
  wherein to generate the pass phrase further includes the computer-readable instructions that, when executed on the one or more processors, cause the one or more processors to:
  determine a complexity of the predetermined number of words based at least in part on the particular security level.

* * * * *